United States Patent
Suzuki

(10) Patent No.: US 10,439,530 B2
(45) Date of Patent: Oct. 8, 2019

(54) MOTOR CONTROLLER

(71) Applicant: DENSO CORPORATION, Kariya, Aichi-pref. (JP)

(72) Inventor: Ryo Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/176,288

(22) Filed: Oct. 31, 2018

(65) Prior Publication Data

US 2019/0149072 A1    May 16, 2019

(30) Foreign Application Priority Data

Nov. 15, 2017    (JP) ................. 2017-219999

(51) Int. Cl.
*H02P 1/00*      (2006.01)
*H02P 3/00*      (2006.01)
*H02P 5/00*      (2016.01)
*H02P 6/28*      (2016.01)
*H02P 6/08*      (2016.01)

(52) U.S. Cl.
CPC .............. *H02P 6/28* (2016.02); *H02P 6/085* (2013.01); *H02P 2209/01* (2013.01)

(58) Field of Classification Search
CPC ...................... H02P 6/28; H02P 6/085
USPC .......................................... 318/139
See application file for complete search history.

(56) References Cited

U.S. PATENT DOCUMENTS

| | | | |
|---|---|---|---|
| 7,439,697 B2* | 10/2008 | Miyazaki | B60L 15/025 318/400.41 |
| 2002/0195978 A1 | 12/2002 | Oyori | |
| 2004/0113584 A1 | 6/2004 | Jinbo | |
| 2014/0334204 A1* | 11/2014 | Hamada | H02P 27/085 363/71 |

* cited by examiner

*Primary Examiner* — Erick D Glass
(74) *Attorney, Agent, or Firm* — Posz Law Group, PLC

(57) ABSTRACT

A motor device includes a first stator connected to a first inverter and a second stator connected to a second inverter. A motor controller controls a supply of first three-phase currents from the first inverter to the first stator, and controls a supply of second three-phase currents from the second inverter to the second stator. Each of the first three-phase currents has a same-phase first compensation current superposed thereon, and each of the second three-phase currents has a same-phase second compensation current superposed thereon. The second compensation current has the same phase as the first compensation current and is reversely polarized relative to the first compensation current.

12 Claims, 13 Drawing Sheets

MOTOR CONTROLLER

CROSS REFERENCE TO RELATED APPLICATION

The present application is based on and claims the benefit of priority of Japanese Patent Application No. 2017-219999, filed on Nov. 15, 2017, the disclosure of which is incorporated herein by reference.

TECHNICAL FIELD

The present disclosure generally relates to a motor control technique for controlling a three-phase motor that is driven by a three-phase electric current.

BACKGROUND

Brushless motors may include two stators with each stator being driven from a three-phase alternating current (AC) power supplied by an inverter. Such motors may include two inverters, where each inverter is paired with one of the stators to individually provide power to the stator.

When the rotation of the brushless motor is locked, that is, prevented from rotating, the motor may continue to receive current at peak or near-peak values from the inverters. As such, motor control when a motor is locked is subject to improvement.

SUMMARY

The present disclosure describes a three-phase synchronous motor control technique and controller that may restrict an amount of the electric current supplied to the stator coils of an electric motor when the motor is in a locked state by superposing a compensation current to lower the peak values of currents supplied to the stator coils.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described with reference to the drawings.

First Embodiment

(1-1) Configuration of a Motor Drive System

Figure 1:
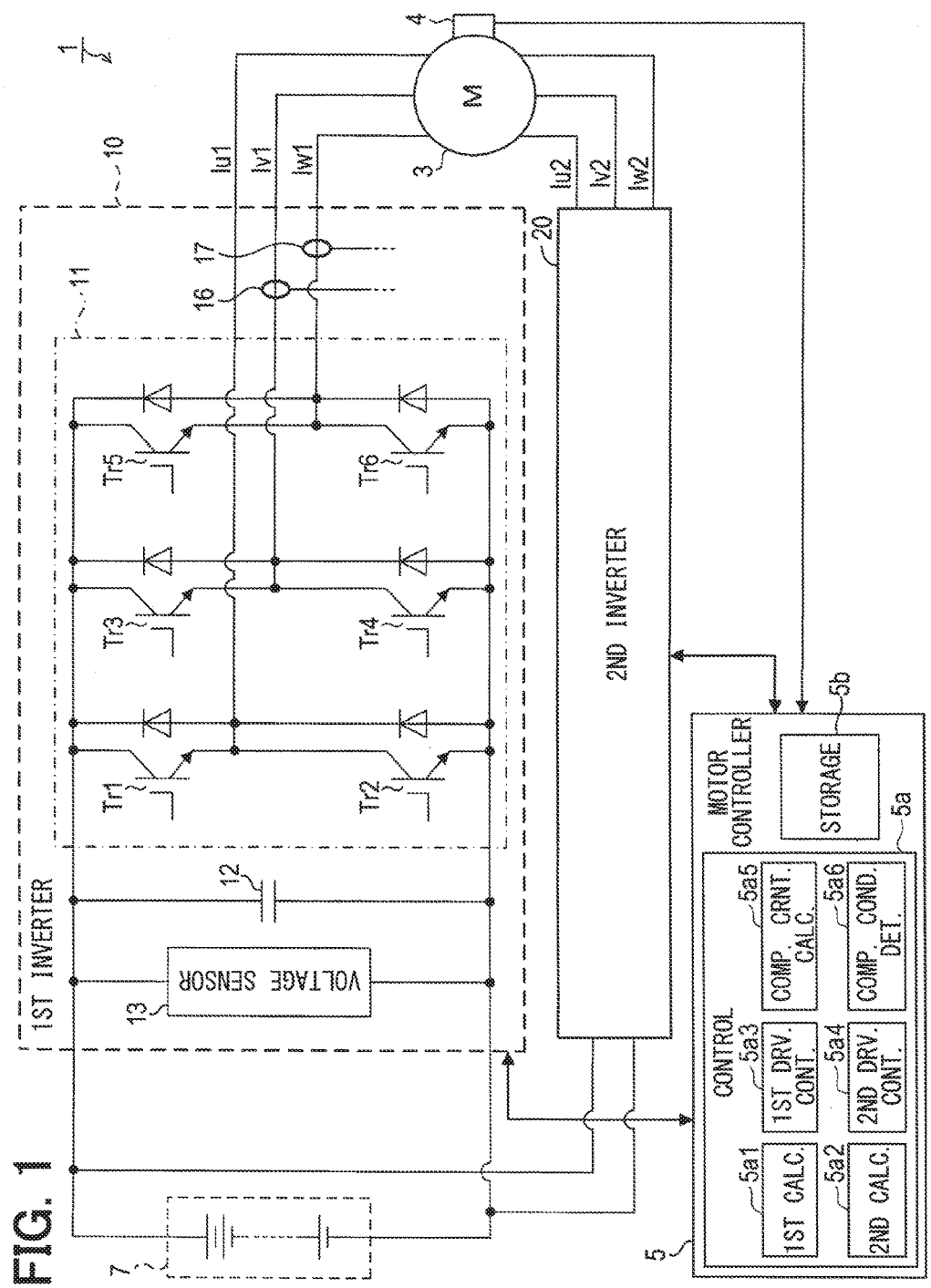
FIG. 1 illustrates a schematic diagram of a motor drive system in a first embodiment of the present disclosure.

As shown in a schematic diagram of a motor drive system in FIG. 1, a motor drive system 1 in the present embodiment includes a motor 3, a motor controller 5, a battery 7, a first inverter 10, and a second inverter 20. The motor drive system 1 may be disposed, for example, in a vehicle such as an automobile. The motor 3 may be used to generate a propulsion force to drive the vehicle. That is, a force generated by the motor 3 may be used for rotating drive wheels on the vehicle to drive and propel the vehicle.

The battery 7 is a power source for driving the motor 3. The battery 7 includes a secondary battery that may be repeatedly recharged, such as, for example, a nickel-hydride battery and a lithium-ion battery. A direct current electric power is output from the secondary battery.

The first inverter 10 and the second inverter 20 are connected to the battery 7 in parallel. The electric power of the battery 7 is supplied to the first inverter 10 and to the second inverter 20.

(1-2) Configuration of the Motor

Figure 2:
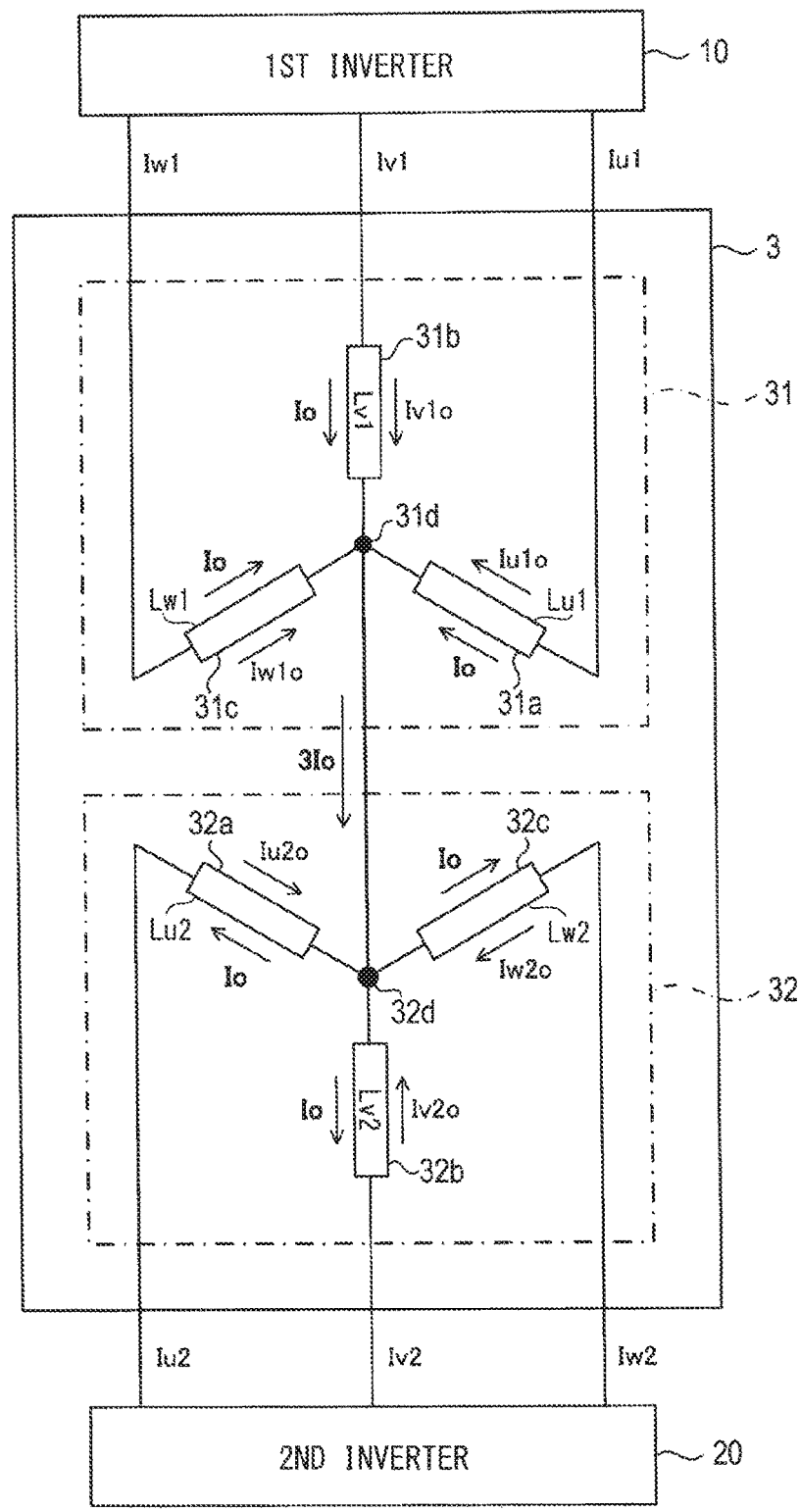
FIG. 2 illustrates a schematic diagram of a motor device in the first embodiment of the present disclosure.
Figure 3:
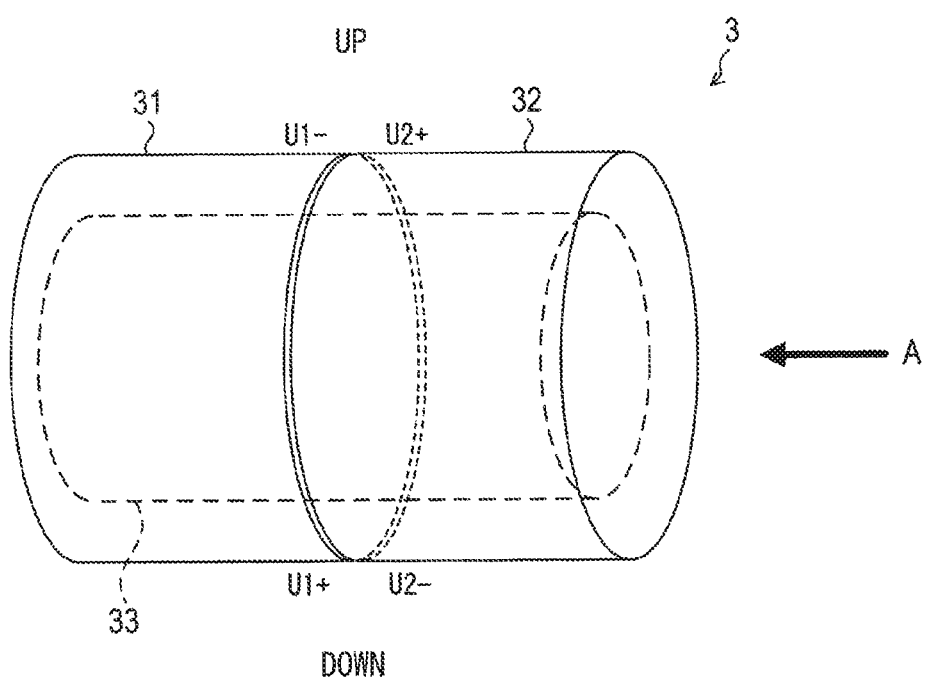
FIG. 3 illustrates a positional relationship between two stators and a rotor of the motor device in the first embodiment of the present disclosure.

As shown in FIGS. 2-4, the motor 3 is provided with a first stator 31, a second stator 32, and a rotor 33. The rotor 33 may be, for example, a permanent-magnet type rotor. The motor 3 in the present embodiment is an inner rotor type synchronous motor configured to rotate the rotor 33 by generating a rotating magnetic field from the two stators 31 and 32.

Figure 4A:
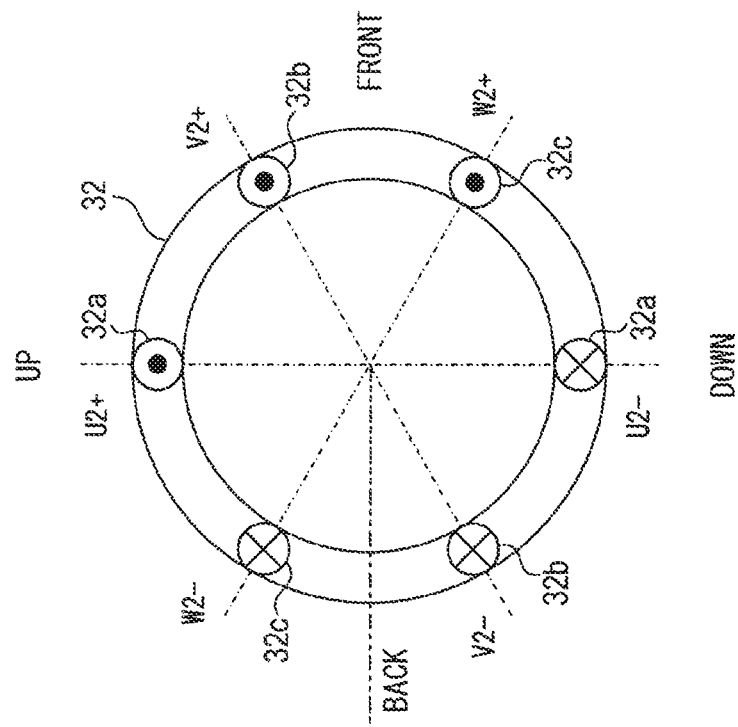
FIG. 4A illustrates a coil position arrangement in one of the two stators of the motor device as viewed from the direction of arrow A shown in FIG. 3.

The first stator 31 includes a U phase coil 31a, a V phase coil 31b, and a W phase coil 31c, as shown in FIGS. 2 and 4A. The impedance of each of these coils 31a, 31b, and 31c is the same. These three coils 31a, 31b, and 31c in the first stator 31 are configured as a wye ("Y") connection where each of the coils 31a, 31b, and 31c is connected to a common neutral point 31d, as shown in FIG. 2. As shown in FIG. 4A, the U phase coil 31a, the V phase coil 31b, and the W phase coil 31c in the first stator 31 are arranged to be offset from one another at intervals of a preset angle (e.g., at 60-degree intervals) along the rotation direction of the rotor 33.

In the first stator 31, one end of each of the three-phase coils 31a, 31b, 31c is connected to the first inverter 10 while the other end of each of the three-phase coils 31a, 31b, and 31c is connected to the neutral point 31d.

Figure 4B:
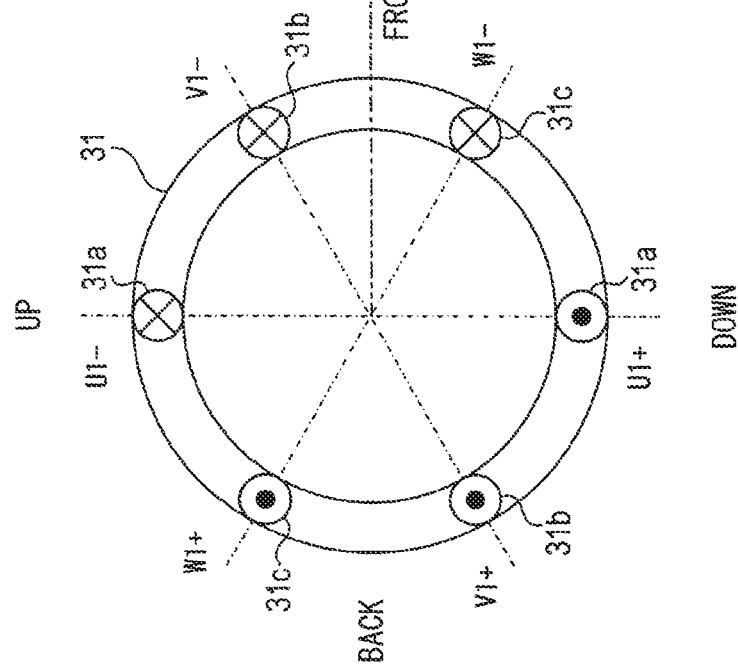
FIG. 4B illustrates a coil position arrangement in another of the two stators of the motor device as viewed from the direction of arrow A shown in FIG. 3.

The second stator 32 includes a U phase coil 32a, a V phase coil 32b, and a W phase coil 32c, as shown in FIGS. 2 and 4B. The impedance of each of these coils 32a, 32b, and 32c is the same. The impedance of the three coils 31a, 31b, and 31c in the first stator 31 may be the same as the impedance of the three coils 32a. 32b, and 32c in the second stator 32, but the impedances may also be different.

These three coils 32a, 32b, and 32c in the second stator 32 are configured as a wye ("Y") connection where each of the coils 32a, 32b, and 32c is connected to a common neutral point 32d, as shown in FIG. 2. As shown in FIG. 4B, the U phase coil 32a, the V phase coil 32b, and the W phase coil 32c in the second stator 32 are arranged to be offset from one another at intervals of a preset angle (e.g., at 60-degree intervals) along the rotation direction of the rotor 33.

In the second stator 32, one end of each of the three-phase coils 32a. 32b, 32c, is connected to the second inverter 20 while the other end of each of the three-phase coils 32a, 32b, and 32c is connected to the neutral point 32d.

The neutral point 31d of the first stator 31 and the neutral point 32d of the second stator 32 are electrically connected, as shown in FIG. 2.

As described herein, an arrangement position of the first stator 31 may refer to the position of each of the coils 31a, 31b, and 31c in the first stator 31 relative to the rotor 33 in or along the rotation direction of the rotor 33. Similarly, an arrangement position of the second stator 32 may refer to the position of each of the coils 32a, 32b, and 32c in the second stator 32 relative to the rotor 33 in or along the rotation direction of the rotor 33.

As described herein, the U phase, V phase, and W phase in the first inverter 10 and in the first stator 31 may be respectively designated as the U1 phase, V1 phase, and W1 phase, or some variation thereof, and the U phase, V phase, and W phase in the second inverter 20 and in the second stator 32 may be respectively designated as the U2 phase, V2 phase, and W2 phase, or some variation thereof.

In the present embodiment, as shown in FIGS. 4A and 4B, the arrangement position of the first stator 31 and the arrangement position of the second stator 32 are different. More practically, the arrangement position of the second stator 32 is rotationally offset from the arrangement position of the first stator 31 by a specific angle (i.e., degrees) in the rotation direction of the rotor 33. In this embodiment, the specific rotational offset is 180 degrees, as shown in FIGS. 4A and 4B. That is, the arrangement positions of the coils 32a, 32b, and 32c in the second stator 32 are rotated 180 degrees from the arrangement positions of the coils 31a, 31b, and 31c in the first stator 31. The positional offset between the stators 31 and 32 is described in greater detail below.

With reference to FIGS. 1 and 3, a resolver 4 is disposed in the motor 3. The resolver 4 is a sensor that detects a rotation angle of the rotor 33 in the motor 3. The resolver 4 outputs rotation angle information to the motor controller 5 based on the rotation angle of the rotor 33, and the motor controller 5 detects the rotation angle of the rotor 33 based on the rotation angle information input from the resolver 4. Generally, the resolver 4 and the motor controller 5 can detect the rotation or rotational angle of the motor 3 by detecting the rotation angle of the rotor 33.

(1-3) Current Supplied to the Motor

The first three-phase currents Iu1, Iv1, Iw1 are supplied respectively to the U phase coil 31a, the V phase coil 31b, and the W phase coil 31c in the first stator 31 from the first inverter 10. The first three-phase currents may mean a first set of three currents Iu1, Iv1, and Iw1, with one of the three currents corresponding to each of the U1, V1, and W1 phases or rather the coils 31a, 31b, and 31c in the first stator.

In the first inverter 10, the first three-phase base currents Iu1o, Iv1o, and Iw1o are computed for rotating the rotor 33 based on the rotation position of the rotor 33. The first three-phase base currents may mean a first set of three base currents with one base current corresponding to each of the U1, V1, and W1 phases. Iu1o is the base current of the U1 phase, Iv1o is the base current of the V1 phase, and Iw1o is the base current of the W1 phase.

In the present embodiment, the rotation position of the rotor 33 is detected as angle information in the motor controller 5. As such, the rotation position of the rotor 33 may be designated as a rotation angle.

Figure 5:
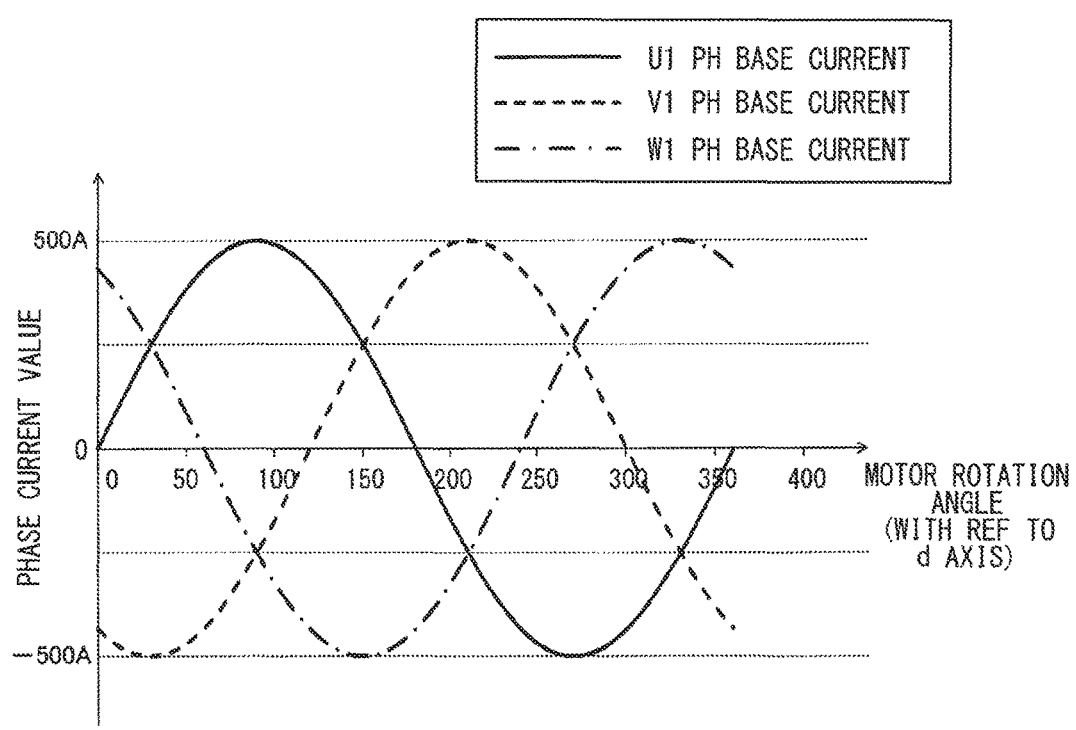
FIG. 5 illustrates a waveform of a first three-phase base current.

Each of the first three-phase base currents Iu1o, Iv1o, and Iw1o is a sine wave AC current having a predetermined frequency, as illustrated in FIG. 5. As shown in FIG. 5, there is a 120-degree phase shift between the first three-phase base currents Iu1o, Iv1o, and Iw1o. For example, the V1 base current Iv1o is shifted 120-degrees relative to the U1 base current Iu1o, as shown in FIG. 5. In FIG. 5, the phase order may be U1, V1, and W1.

These first three-phase base currents Iu1o, Iv1o, and Iw1o may be supplied respectively to the phase coils 31a, 31b, and 31c in the first stator 31 as the first three-phase currents Iu1, Iv1, Iw1.

The second three-phase currents Iu2, Iv2, Iw2 are supplied to the U phase coil 32a, the V phase coil 32b, and the W phase coil 32c in the second stator 32 from the second inverter 20. The second three-phase currents Iu2, Iv2, and Iw2 may mean a second set of three currents, with one of the three currents corresponding to each of the U2, V2, and W2 phases, or rather the coils 32a. 32b, and 32c, in the second stator 32.

In the second inverter 20, the second three-phase base currents Iu2o, Iv2o, and Iw2o are computed for rotating the rotor 33 based on the rotation position of the rotor 33. The second three-phase base currents may mean a second set of three base currents with one base current corresponding to each of the U2, V2, and W2 phases. Iu2o is the base current of the U2 phase, Iv2o is the base current of the V2 phase, and Iw2o is the base current of the W2 phase.

Each of the second three-phase base currents Iu2o, Iv2o, and Iw2o is a sine wave-shaped AC current having a predetermined frequency. The second three-phase base currents Iu2o, Iv2o, and Iw2o may have the same amplitude and the same frequency as the first three-phase base currents Iu1o, Iv1o, and Iw1o. Similar to the first three-phase base currents shown in FIG. 5, the second three-phase base currents for U2, V2, and W2 may have a 120-degree phase shift between the base currents. For example, U2 may be offset from V2 and W2 by 120-degrees.

These second three-phase base currents Iu2o, Iv2o, and Iw2o may be supplied respectively to the phase coils 32a, 32b, and 32c in the second stator 32 as the second three-phase currents Iu2, Iv2, Iw2 respectively.

In the present embodiment, the first three-phase currents Iu1, Iv1, and Iw1 supplied to the first inverter may be modifications or compensated values of the respective first three-phase base currents Iu1o, Iv1o, and Iw1o. The first-three phase currents Iu1, Iv1, and Iw1 may be realized by superposing a first compensation current Io on the first three-phase base currents Iu1o, Iv1o, and Iw1o in the first inverter 10, and then supplying these compensated base currents as the first three-phase currents Iu1, Iv1, and Iw1 to the phase coils 31a. 31b, and 31c. For ease of understanding and consistency, the currents supplied to the phase coils 31a, 31b, and 31c may be referred to simply as the first three-phase current Iu1, Iv1, and Iw1, regardless of whether the first three-phase base currents Iu1o, Iv1o, and Iw1o are modified by the first compensation current Io. For example, as described in greater detail below, if current compensation conditions are not met, the first three-phase base current Iu1o, Iv1o, and Iw1o may be supplied, as is (e.g., without compensation), as the first three-phase current Iu1, Iv1, and Iw1. The principle of wave superposition may be used to combine two different waveforms and their representative values to represent a resultant wave. For example, the waveform of the first compensation current Io may be "superposed" on the first three-phase base current waveforms Iu1o, Iv1o, and Iw1o to realize the first three-phase currents Iu1, Iv1, and Iw1. The superposition or combination of the waves and values assumes a phase matching (e.g., at the same phase angles) of the waves. For example, when the first compensation current Io is superposed on the first three-phase base currents, the value of the first compensation current Io at a given phase angle is superposed onto the value of the first three-phase base currents at the same given phase angle. As such, the first compensation current Io has the same phase when it is superposed on the first three-phase base currents Iu1o, Iv1o, and Iw1o.

One purpose of superposing the first compensation current Io is to reduce and lower the peak value of the first three-phase currents Iu1, Iv1, Iw1 supplied from the first inverter 10 to the first stator 31 to be less than the peak value of the first three-phase base currents Iu1o, Iv1o, and Iw1o. While the principle of wave superposition may be considered as an additive concept, the principle is not limited to an additive property in this description. As described in greater detail below, the superposing of the first compensation current Io on the first three-phase base currents Iu1o, Iv1o, and Iw1o may mean "subtracting" the values of the first compensation current Io from the first three-phase base currents Iu1o, Iv1o, and Iw1o.

With reference to FIG. 5, an example situation is assumed where (i) the first three-phase base currents Iu1o, Iv1o, and Iw1o are supplied from the first inverter 10, and (ii) the motor 3 becomes locked, which may also be referred to as the motor 3 being in a "locked condition" or a "locked state." That is, the rotation of the rotor 33 is forcefully stopped, when the rotation angle of the motor 3 is about 200) degrees.

Figure 6:
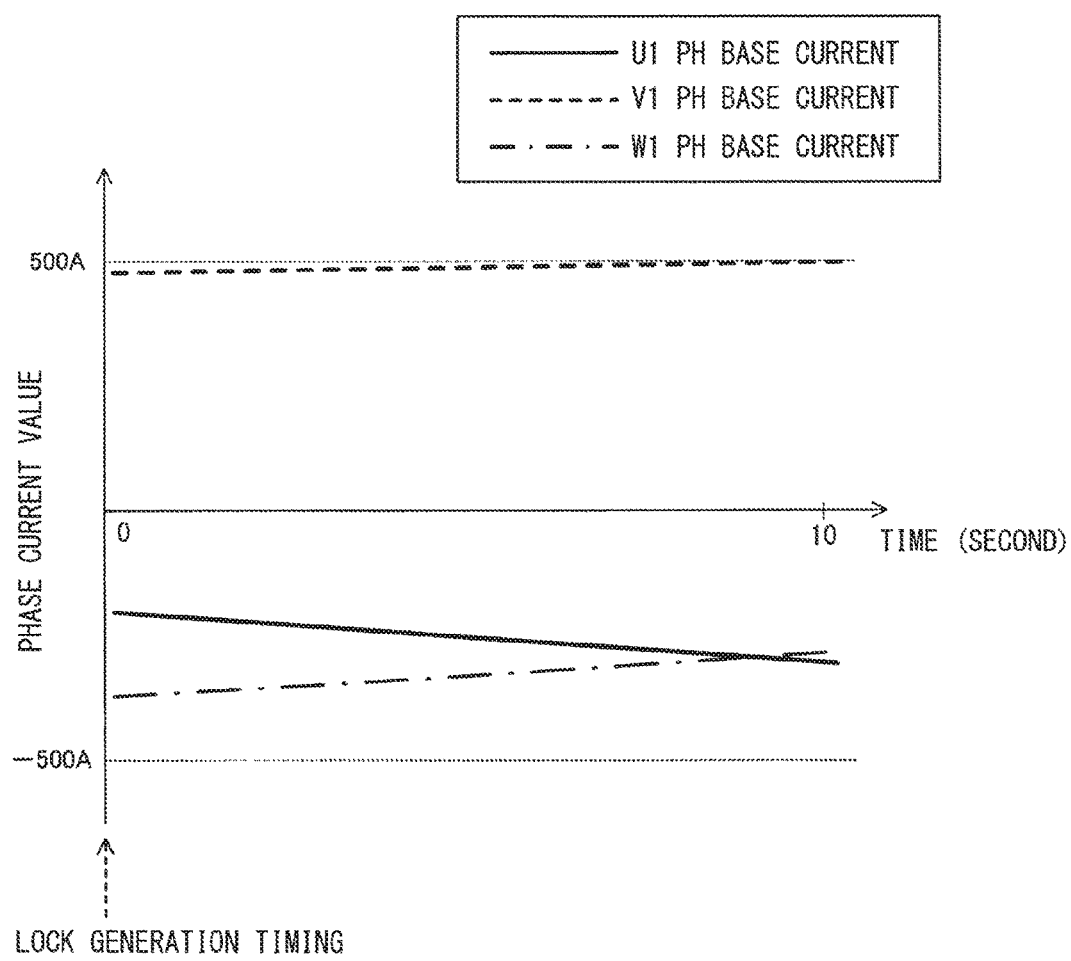
FIG. 6 illustrates a waveform of the first three-phase base current changing when the motor is locked.

As shown in FIG. 5, when the rotation angle of the motor 3 is about 200 degrees, the V1 phase base current Iv1o is close to reaching a peak value. As shown in FIG. 6, if the motor 3 locks at such time (i.e., the time when the motor lock condition occurs or "lock generation timing"), the V1 phase base current Iv to will maintain a high value at or near the peak current value. As such, the circuit and/or individual circuit elements in which the V1 phase base current Iv1o flows may be affected and/or damaged by such a high amount of current.

In the present embodiment, when the motor 3 becomes locked, that is, enters into a locked state or locked condition, the predetermined current compensation conditions are satisfied, and a peak current or a near-peak current is prevented from continuously flowing to the first stator 31 by superposing the first compensation current Io on the first three-phase base currents Iu1o, Iv1o, and Iw1o. In other words, the predetermined current compensation condition may be the locking of the motor 3, which triggers the superposing of the first compensation current Io on the first three-phase base currents Iu1o, Iv1o, and Iw1o to realize and supply the first three-phase currents Iu1, Iv1, and Iw1 to the coils of the first stator 31.

When the first compensation current to is supplied from the first inverter 10 to each of the phase coils 31a, 31b, and 31c of the first stator 31, each of the first three compensation currents Io are combined at the neutral point 31d of the first stator 31, and flows from the neutral point 31d on the first stator to the neutral point 32d of the second stator 32 after such combination.

At the neutral point 32d of the second stator 32, the combined compensation currents are divided to respectively flow to each of the phase coils 32a, 32b, and 32c of the second stator 32, and are then input to the second inverter 20 through each of the phase coils 32a, 32b, and 32c.

That is, the first compensation current Io in each phase flows through the current path that extends from the first inverter 10 through the first stator 31 and further through the second stator 32 to the second inverter 20.

For realizing such a current path for each of the first compensation currents Io, when the first compensation current Io is supplied from the first inverter 10 to each of the phase coils 31a, 31b and 31c of the first stator 31, a second compensation current −Io that has the same phase but a reverse polarity of the first compensation current Io is supplied from the second inverter 20 to each of the phase coils 32a, 32b, and 32c of the second stator 32. The second compensation currents −Io supplied to the phase coils 32a, 32b, and 32c have the same phase as each other. For ease of understanding and consistency, the description refers to the first compensation current Io in the positive and the second compensation current −Io in the negative, but due to the cyclical nature of the current waveforms, the respective compensation currents are not limited to these polarity designations. For example, there may be times when the first compensation current Io is a negative value and during these times, the second compensation current −Io may be a positive value.

In the second inverter 20, the second three-phase base currents Iu2o, Iv2o, and Iw2o may have, respectively, the second compensation current −Io superposed thereon to become the second three-phase currents Iu2, Iv2, Iw2 that are supplied to the phase coils 32a, 32b, and 32c.

The supply of the second compensation current −Io to each of the phase coils 32a, 32b, and 32c of the second stator 32 means that the first compensation current Io is supplied to each of the phase coils 32a, 32b, and 32c of the second stator 32 in a reverse direction. In other words, the polarity of the first compensation current Io supplied to the phase coils 32a, 32b, and 32c of the second stator 32 is reversed relative to the flow direction of the first compensation current Io when it is supplied to the first stator 31.

By having the first compensation current Io superposed by the first inverter 10 and having the second compensation current −Io superposed by the second inverter 20, the first compensation current Io may be considered as forming a power supply loop, which extends from a positive terminal of the battery 7 to the first inverter 10, through the first/second stators 31, 32 to the second inverter 20, and back to a negative terminal of the battery 7.

As described above, the first compensation current Io may be supplied from the first inverter 10 and the second compensation current −Io may be supplied from the second inverter 20 to suppress the peak value of the first three-phase current Iu1, Iv1, and Iw1 to a lower value. However, depending on the size (i.e., amount) of the second compensation current −Io relative to the second three-phase base currents Iu2o, Iv2o, and Iw2o, it is possible that the peak value of the second three-phase currents Iu2, Iv2, and Iw2 may be larger than the peak value of the second three-phase base currents Iu2o, Iv2o, and Iw2o.

Therefore, in order to lower the peak value of the second three-phase currents Iu2, Iv2, and Iw2 using a compensation current when a compensation current is also used to suppress the peak value of the first three-phase currents Iu1, Iv1, and Iw1, the second three-phase base currents Iu2o, Iv2o, and Iw2o are supplied to the second stator 32 having a different phase. That is, the second three-phase base currents Iu2o, Iv2o, and Iw2o may have a different phase (e.g., offset) from the first three-phase base currents Iu1o, Iv1o, and Iw1o. For example, the second three-phase base currents Iu2o, Iv2o, and Iw2o may have a 180-degree phase shift from the first three-phase base currents Iu1o, Iv1o, and Iw1o.

When the second three-phase base currents Iu2o, Iv2o, and Iw2o with the 180-degree phase offset are supplied to the second stator 32, and the arrangement position of the second stator 32 is the same as the first stator 31, the torque provided by the second stator 32 to the rotor 33 may be reduced.

As such, when the second three-phase base currents Iu2o, Iv2o, and Iw2o are phase shifted relative to the first three-phase base currents Iu1o, Iv1o, and Iw1o, the arrangement position of the second stator 32 may also be rotationally shifted in the rotation direction of the rotor 33 by a specific degree or rotational angle relative to the arrangement position of the first stator 31, for example, as shown in FIGS. 4A and 4B. Here, when the second three-phase base currents Iu2o, Iv2o, and Iw2o are phase shifted by 180 degrees, the arrangement position of the second stator 32 is rotated 180 degrees relative to the arrangement position of the first stator 31. Such a rotation of the second stator 32 when the three-phase base currents Iu2o, Iv2o, and Iw2o are phase shifted may limit the reduction of the output torque from the second stator 32.

(1-4) Configuration of an Inverter

As shown in FIG. 1, the first inverter 10 is provided with a three-phase bridge circuit 11 including six switching elements Tr1, Tr2, Tr3, Tr4, Tr5, and Tr6. Each of the switching elements Tr1-Tr6 may be an insulated-gate type bipolar transistor in the present embodiment.

The positive terminal and the negative terminal of the battery 7 are connected to the three-phase bridge circuit 11 to supply a direct current (DC) power to the bridge circuit 11. A first driving signal for driving the first inverter 10 is provided from the motor controller 5 to the first inverter 10. The switching elements Tr1-Tr6 are turned on or off based on the first driving signal. The first inverter 10 converts the DC electric power supplied from the battery 7 into the three-phase currents, and supplies the three-phase currents to the first stator 31. In other words, the inverter 10 takes the DC input from the battery 7 and provides an AC output for the first stator 31. The three-phase currents provided to the stator 31 are used to generate a magnetic field to rotate the rotor 33 of the motor 3.

More practically, the first inverter 10 converts the direct current electric power supplied from the battery 7 to the first three-phase currents that have a U1 phase current Iu1, a V1 phase current Iv1, and a W1 phase current Iw1 based on the driving signal from the motor controller 5. Then, the U1 phase current Iu1 is supplied to the U phase coil 31a, the V1 phase current Iv1 is supplied to the V phase coil 31b, and the W1 phase current Iw1 is supplied to the W phase coil 31c.

When the predetermined current compensation conditions are not satisfied, the first three-phase currents Iu1, Iv1, Iw1 are the first three-phase base currents Iu1o, Iv1o, and Iw1o. That is, the first-three phase current Iu1, Iv1, and Iw1 may be based on the rotation angle of the rotor 33 relative to the first stator 31, such that the U1 phase uses the base current Iu1o, the V1 phase uses the base current Iv1o, and the W1 phase uses the base current Iw1o.

On the other hand, when the current compensation conditions are satisfied, the first inverter 10 supplies each of the phase coils 31a, 31b, and 31c with the respective first three-phase currents Iu1, Iv1, and Iw1, which are realized as the first three-phase base currents Iu1o, Iv1o, and Iw1o with the superposed compensation current Io. The first inverter 10 supplies each of the phase coils 31a, 31b, and 31c based on the first driving signal from the motor controller 5 upon satisfaction of the current compensation conditions.

The first inverter 10 includes an input capacitor 12 and a voltage sensor 13. The input capacitor 12 and the voltage sensor 13 are respectively connected in parallel with the three-phase bridge circuit 11 to the battery 7. The voltage sensor 13 detects the voltage of the battery power that is input from the battery 7 to the first inverter 10 and outputs a detection signal based on the detected voltage to the motor controller 5.

The first inverter 10 also includes two current sensors 16 and 17. The current sensor 16 is disposed on the V1 phase current path by which the current Iv1 is supplied from the three-phase bridge circuit 11 to the motor 3. The current sensor 16 detects the V1 phase current Iv1 and outputs a detection signal with the value of the V1 phase current Iv1 to the controller 5. Similarly, the current sensor 17 is disposed on the W1 phase current path and detects the W1 phase current Iw1 supplied from the three-phase bridge circuit 11 to the motor 3. The current sensor 17 outputs a detection signal with the value of the W1 phase current to the motor controller 5. Based on only the detection signals from the current sensors 16 and 17, the motor controller 5 can determine a value of each of the first three-phase currents Iu1, Iv1, Iw1.

The second inverter 20 is configured in much the same way as the first inverter 10. That is, the second inverter 20 converts the direct current electric power supplied from the battery 7 to the three-phase currents based on a second driving signal from the motor controller 5 for driving the second inverter 20, and supplies the three-phase currents to the second stator 32. The second stator 32 uses the three-phase currents to rotate the rotor 33 of the motor 3.

More practically, the second inverter 20 converts the direct current electric power supplied from the battery 7 to the second three-phase currents that have a U2 phase current Iu2, a V2 phase current Iv2, and a W2 phase current Iw2 based on the second driving signal from the motor controller 5. Then, the U2 phase current Iu2 is supplied to the U phase coil 32a, the V2 phase current Iv2 is supplied to the V phase coil 32b, and the W2 phase current Iw2 is supplied to the W phase coil 32c.

When the current compensation conditions are not satisfied, the second three-phase currents Iu2, Iv2, Iw2 are the second three-phase base currents Iu2o, Iv2o, and Iw2o. That is, the U2 phase uses the base current Iu2o, the V2 phase uses the base current Iv2o, and the W2 phase uses the base current Iw2o.

On the other hand, when the current compensation conditions are satisfied, the second inverter 20 superposes the second compensation current −Io on each of the second three-phase base currents Iu2o, Iv2o, and Iw2o, and supplies the compensated three-phase base currents to the respective phase coils 32a, 32b, and 32c, based on the output of the second driving signal from the motor controller 5 when the current compensation conditions are satisfied.

(1-5) Description of the Motor Controller

The motor controller 5 controls the drive of the motor 3 by controlling the first inverter 10 and the second inverter 20 based on various signals and information, including input signals from the resolver 4, each of the current sensors 16 and 17, and the voltage sensor 13. As used herein, the control of the first inverter 10 by the motor controller 5 may be designated simply as a "first drive control", and the control of the second inverter 20 by the motor controller 5 may be designated simply as a "second drive control."

As shown in FIG. 1, the motor controller 5 includes a control section 5a and a storage section 5b. The control section 5a has a CPU or like processor. The storage section 5b has a semiconductor memory that may be, for example, a ROM, a RAM, an NVRAM, and a flash memory. That is, the motor controller 5 in the present embodiment may be a microcomputer including a CPU and a semiconductor memory.

The control section 5a may include a first calculator 5a1, a second calculator 5a2, a first drive controller 5a3, a second drive controller 5a4, a compensation current calculator 5a5, and a compensation condition determiner 5a6. As used herein, the control section 5a may refer either to a microcomputer or like processing device, or to the elements 5a1-5a6 collectively.

The control section 5a may realize various functions including the first drive control and the second drive control by executing a program or instruction set stored in the storage section 5b. As such, the storage section 5b may be a non-transitive, substantive storage medium that stores a program or instruction set. Various kinds of programs and data, including a program for a current compensation and a current control process may be stored in the storage section 5b.

The various functions realized by the control section 5a may not be limited to realization by an execution of a program by a microcomputer 5a, but may also be realized by dedicated or specific hardware.

Figure 7:
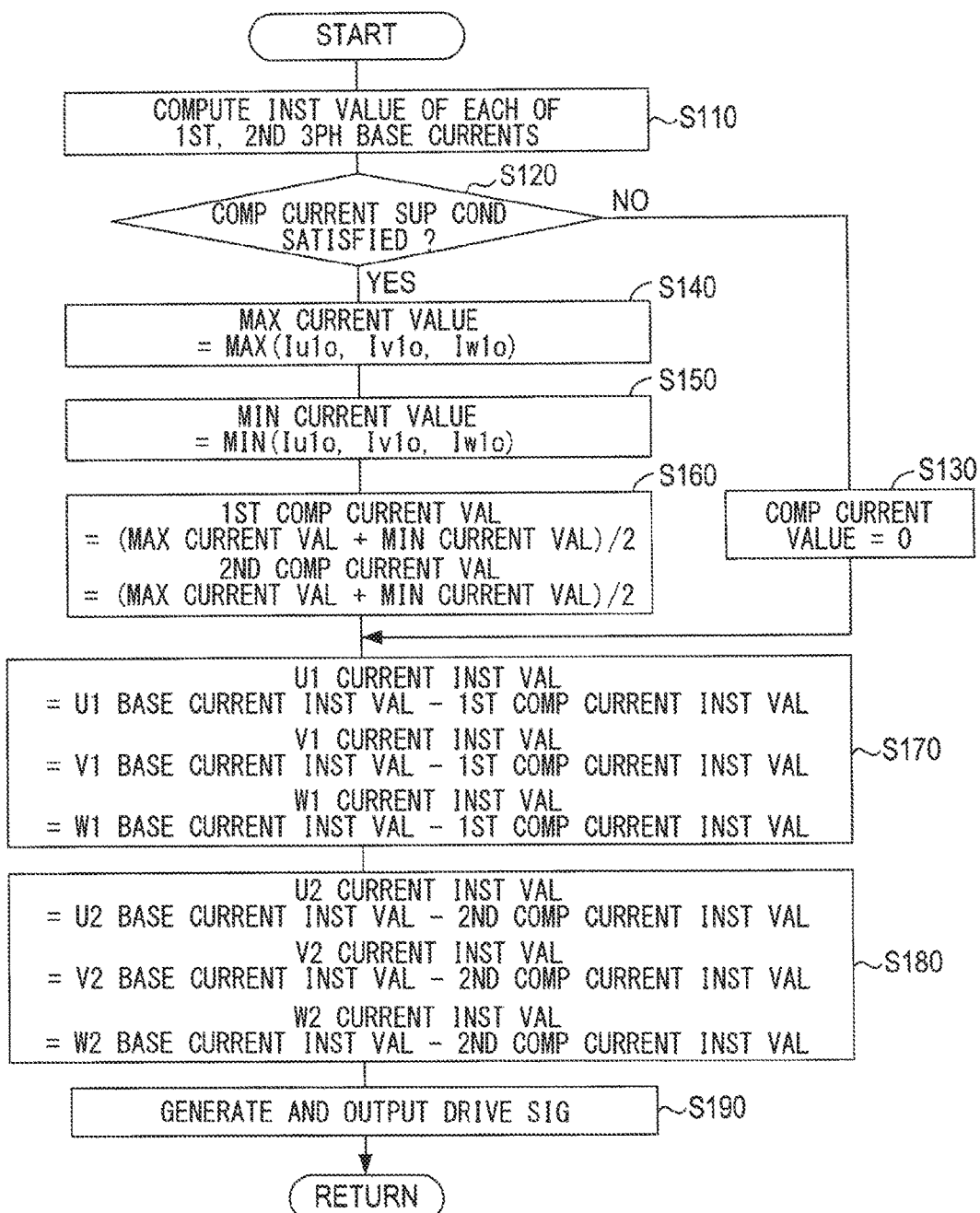
FIG. 7 is a flowchart of a motor control process in the first embodiment of the present disclosure.

When the various functions realized by the control section 5a are realized by a microcomputer 5a executing a program or instruction set stored in the storage section 5b, the first calculator 5a1, the second calculator 5a2, the first drive controller 5a3, the second drive controller 5a4, the compensation current calculator 5a5, and the compensation condition determiner 5a6 may be considered as functional blocks, e.g., processes performed by the microcomputer 5a of the motor controller 5, as described below in greater detail with reference to FIG. 7.

However, the various functions performed by the control section 5a may also be realized by hardware. In this case, each of the first calculator 5a1, the second calculator 5a2, the first drive controller 5a3, the second drive controller 5a4, the compensation current calculator 5a5, and the compensation condition determiner 5a6 may each be hardware components or a combination of a plurality of hardware components (e.g., circuits). That is, the first calculator 5a1, the second calculator 5a2, the first drive controller 5a3, the second drive controller 5a4, the compensation current calculator 5a5, and the compensation condition determiner 5a6 may be realized as digital circuits with digital components, analog circuits with analog components, or a combination of both, in addition to having logical circuit elements such as logic gates, latches, and the like. Each of the first calculator 5a1, the second calculator 5a2, the first drive controller 5a3, the second drive controller 5a4, the compensation current calculator 5a5, and the compensation condition determiner 5a6 may be realized as an application-specific integrated circuit (ASIC), field-programmable gate array, or like specialized hardware circuit configured to perform a specific process. The specific processes performed by the first calculator 5a1, the second calculator 5a2, the first drive controller 5a3, the second drive controller 5a4, the compensation current calculator 5a5, and the compensation condition determiner 5a6 are described in greater detail below with reference to FIG. 7.

The motor controller 5 performs the first drive control for generating a maximum torque on the rotor 33 based on the rotation angle of the rotor 33. That is, the motor controller 5 computes the first three-phase base currents Iu1o, Iv1o, and Iw1o having a phase based on the rotation angle of the rotor 33 relative to the first stator 31, for rotating the rotor 33. The relations between the first three-phase base currents Iu1o, Iv1o, and Iw1o, the phase current values of the base currents, and the rotation angles of the rotor 33 are illustrated in FIG. 5. The first three-phase base currents Iu1o, Iv1o, and Iw1o are computed for generating the maximum torque on the rotor 33, for example, as shown in FIG. 5.

If the current compensation conditions are not satisfied (e.g., the motor 3 is not in a locked state or condition), the first driving signal is output to the first inverter 10, for supplying the computed first three-phase base currents Iu1o, Iv1o, and Iw1o to the first stator 31 as the first three-phase currents Iu1, Iv1, Iw1.

On the other hand, when the current compensation conditions are satisfied, the first compensation current Io is computed. Then, the first driving signal is output to the first inverter 10 to supply the first three-phase currents Iu1, Iv1, Iw1 to the first stator 31. As described above, when the current compensation conditions are satisfied, the first three-phase currents Iu1, Iv1, and Iw1 are realized as the first three-phase base currents Iu1o, Iv1o, and Iw1o with the superposed first compensation current Io. The first compensation current Io is computed, for example, based on the first three-phase base currents.

The motor controller 5 performs the second drive control for generating a maximum torque on the rotor 33 based on the rotation angle of the rotor 33. That is, the motor controller 5 computes the second three-phase base currents Iu2o, Iv2o, and Iw2o having a phase based on the rotation angle of the rotor 33 relative to the second stator 32, for rotating the rotor 33. That is, motor controller 5 computes the second three-phase base currents Iu2o, Iv2o, and Iw2o that are capable of generating the maximum torque on the rotor 33.

In the present embodiment, as described above, the second three-phase base currents Iu2o, Iv2o, and Iw2o are computed as respectively having a 180-degree phase shift from the first three-phase base currents Iu1o, Iv1o, and Iw1o, since the arrangement position of the second stator 32 has a phase shift of 180 degrees relative to the arrangement position of the first stator 31.

When the current compensation conditions are not satisfied, the second driving signal is output to the second stator 32 for supplying the computed second three-phase base currents Iu2o, Iv2o, and Iw2o as the second three-phase currents Iu2, Iv2, Iw2 to the second inverter 20.

On the other hand, when current compensation conditions are satisfied, the second compensation current −Io is computed. Then, the second driving signal is output to the second inverter 20 for supplying the second three-phase currents Iu2, Iv2, and Iw2 to the second stator 32 that respectively have the computed second compensation current −Io superposed on the second three-phase base currents Iu2o, Iv2o, and Iw2o.

(1-6) Motor Control Process

The motor control process performed by the motor controller 5 is described with reference to FIG. 7. The following description of the motor control process performed by the motor controller 5 realizes both the process where the control section 5a executes a program or instruction set saved in the storage section 5b for performing the following processes, or where the motor controller 5 includes hardware components such as the first calculator 5a1, the second calculator 5a2, the first drive controller 5a3, the second drive controller 5a4, the compensation current calculator 5a5, and the compensation condition determiner 5a6 for performing the processes described below. Motor controller 5 may be used to generally describe the structural element performing the processes below, but this may mean, more specifically, processes performed by either the control section 5a realized as a microcomputer or other processing device, or by the individual hardware components 5a1-5a6.

In the motor controller 5, after starting its operation, the control section 5a will carry out a repeated execution of the motor control process of FIG. 7 at a predetermined interval (e.g., at every 100 microseconds) when a drive condition is satisfied for driving the motor 3 to generate a torque, that is, when the motor is to be driven/operated.

After starting the motor control process, at S110 the control section 5a, computes instruction values that respectively indicate (i) the first three-phase base currents Iu1o, Iv1o, and Iw1o, and (ii) the second three-phase base currents Iu2o. Iv2o, and Iw2o, based on the rotation angle of the rotor 33 as detected by the resolver 4. More specifically, when realized as hardware components, the first calculator 5a1 may compute the instruction values for the first three-phase base currents Iu1o, Iv1o, and Iw1o based on the rotation angle of the rotor 33, and the second calculator 5a2 may calculate the second three-phase base currents Iu2o, Iv2o, and Iw2o based on the rotation angle of the rotor 33.

More practically, the motor controller 5 calculates a U1 phase base current instruction value indicating the U1 phase base current Iu1o, a V1 phase base current instruction value indicating the V1 phase base current Iv1o, a W1 phase base current instruction value indicating the W1 phase base current Iw1o, a U2 phase base current instruction value indicating the U2 phase base current Iu2o, a V2 phase base current instruction value indicating the V2 phase base current Iv2o, and a W2 phase base current instruction value indicating the W2 phase base current Iw2o. More specifically, the control section 5a or the first calculator 5a1 and the second calculator 5a2 may computer these instruction values.

At S120, the motor controller 5 determiners whether the current compensation conditions are satisfied. Specifically, the microcomputer 5a or the compensation condition determiner 5a6 may be used to determine whether the current compensation conditions are satisfied. The current compensation conditions may include, for example, conditions where the motor 3 is locked, that is, conditions where the motor 3 is in a locked condition or locked state.

There may be more concrete indicators of a motor 3 lock condition or lock state. For example, the motor 3 may be in a lock state (i) when the rotor 33 of the motor 3 completely stops, (ii) when the rotation speed of the rotor 33 is equal to or below a predetermined threshold, or (iii) when the rotation speed of the rotor 33 continues to be equal to or below a predetermined threshold for a predetermined duration or longer.

Various detection methods may be used to determine whether the motor 3 is in a lock state or lock condition. For example, the lock state may be detected based on the current values detected by each of the current sensors 16 and 17. The lock state may also be detected based on the rotation angle of the rotor 33 detected by the resolver 4. Other specialized hardware for detecting a lock condition of the motor 3 may be used, with such hardware outputting a signal indicative of a motor lock condition to the motor controller 5. For example, specialized hardware for determining the rotation speed of the rotor and/or a timing circuit may be used to determine whether the motor 3 is in a locked state or condition. The output of such sensors and hardware may be input to the microcomputer 5a or the compensation condition determiner 5a6 to determine whether the current compensation conditions are satisfied.

When the motor controller 5 determines that the current compensation conditions are not satisfied at S120, i.e., "NO" at S120, the process proceeds to S130 and the motor controller 5 (e.g., control section 5a or compensation current calculator 5a5) sets both of the first compensation current value and the second compensation current value to 0, and the process proceeds to S170. At S130, the motor controller 5 may also calculate a first compensation current instruction value and a second compensation current instruction value respectively corresponding to the compensation current values of 0. Each of the first compensation current instruction value and the second compensation current instruction value may also have values of 0.

At S120, when the motor controller 5 determines that current compensation conditions are satisfied, i.e., "YES" at S120, the process proceeds to S140. Though the processes at S140-S160 are described below as performed by the motor controller 5, this may mean that the processes at S140-S160 are performed either by the control section 5a realized as a microcomputer, or performed by the compensation current calculator 5a5.

At S140, the motor controller 5 obtains a maximum current value from among the first three-phase currents Iu1, Iv1, and Iw1 currently being supplied to the first stator 31. The motor controller 5 may obtain the maximum current value, for example, based on each of the detection signals from the current sensors 16 and 17. Alternatively, instead of obtaining the maximum value of the first three-phase currents Iu1, Iv1, Iw1, the motor controller 5 may obtain the maximum value of the first three-phase base currents Iu1o, Iv1o, and Iw1o computed at S110.

At S150, the motor controller 5 obtains a minimum current value from among the first three-phase currents Iu1, Iv1, and Iw1 currently being supplied to the first stator 31. The minimum current value may be, for example, obtained based on each of the detection signals from the current sensors 16 and 17. Alternatively, instead of obtaining the minimum value of the first three-phase currents Iu1, Iv1, and Iw1, the motor controller 5 may obtain a minimum value of the first three-phase base currents Iu1o, Iv1o, and Iw1o computed at S110.

At S160, the motor controller 5 computes the first compensation current value (Io) and the second compensation current value (-Io). More practically, the motor controller may calculate an average of the maximum current value obtained at S140 and the minimum current value obtained at S150 and set the average as the first compensation current value. The controller may set the additive inverse of the first compensation current value, that is, the opposite or negation of the first compensation current value, as the second compensation current value. For example, if the first compensation current value is 1, the motor controller 5 may set the second compensation current value to -1. As another example, if the first compensation current value is -3, the motor controller 5 may set the second compensation current value to 3. At S160, the motor controller 5 calculates the first compensation current instruction value corresponding to the first compensation current value and calculates the second compensation current instruction value corresponding to the second compensation current value. As shown in FIGS. 8A-8F, the compensation currents may appear as triangle waves, and as third harmonics of the three-phase base currents. That is, the compensation currents may be three times the frequency of the three-phase base currents.

At S170, the motor controller 5, that is either the control section 5a realized as a microcomputer or the first drive controller 5a3, computes the instruction value indicating each of the first three-phase currents Iu1, Iv1, Iw1 that are to be supplied to the first stator 31, that is, a U1 phase current instruction value, a V1 phase current instruction value, and a W1 phase current instruction value. More practically, the motor controller 5 computes the U1 phase current instruction value by subtracting the first compensation current instruction value computed at S130 or S160 from the U1 phase base current instruction value computed at S110. That is, the first compensation current instruction value is superposed on the U1 phase base current instruction value.

When the first compensation current instruction value is a value computed at S130 (e.g., 0), that is, when the current compensation conditions are not satisfied, the U1 phase current instruction value is set to be equal to the U1 phase base current instruction value, which means that the first compensation current value is not superposed. On the other hand, when the first compensation current instruction value is a value computed at S160, that is, when the current compensation conditions are satisfied, the U1 phase current instruction value is a value different from the U1 phase base current instruction value. That is, the U1 phase current instruction value is set as an instruction value computed from the superposition of the first compensation current value on the U1 phase base current value.

Similarly, at S170, the V1 phase current instruction value is computed by subtracting the first compensation current instruction value computed at S130 or S160 from the V1 phase base current instruction value computed at S110. The W1 phase current instruction value is computed by subtracting the first compensation current instruction value computed at S130 or S160 from the W1 phase base current instruction value.

At S180, the motor controller 5, more specifically either the control section 5a realized as a microcomputer or the second drive controller 5a4, computes the instruction value indicating each of the second three-phase currents Iu2, 1v2, and Iw2 that are to be supplied to the second stator 32, that is, the U2 phase current instruction value, the V2 phase current instruction value, and the W2 phase current instruction value. The computation method for these instruction values is the same as the computation method used at S170.

More practically, the U2 phase current instruction value is computed by subtracting the second compensation current instruction value computed at S130 or S160 from the U2 phase base current instruction value computed at S110. That is, the U2 phase current instruction value is computed by superposing the second compensation current instruction value with the U2 phase base current instruction value.

In such case, when the second compensation current instruction value is a value computed at S130 (e.g., 0), that is, when the current compensation conditions are not satisfied, the U2 phase current instruction value is set to be equal to the U2 phase base current instruction value, which means that there is no superposing or combining of the U2 phase base current instruction value and the second compensation current value. On the other hand, when the second compensation current instruction value is a value computed at S160, the U2 phase current instruction value is different from the U2 phase base current instruction value. That is, the U2 phase current instruction value is set as an instruction value realized by superposing or combining the second compensation current value with the U2 phase base current value.

Similarly, at S180, the V2 phase current instruction value is computed by subtracting the second compensation current instruction value computed at S130 or S160 from the V2 phase base current instruction value computed at S110. The W2 phase current instruction value is computed by subtracting the second compensation current instruction value computed at S130 or S160 from the W2 phase base current instruction value.

At S190, based on the U1 phase current instruction value, the V1 phase current instruction value, and the W1 phase current instruction value computed at S170, the motor controller 5, specifically either the control section 5a realized as a microcomputer or the first drive controller 5a3, generates the first driving signal for driving the first inverter 10 and outputs the first driving signal to the first inverter 10. In such manner, the first three-phase currents Iu1, Iv1, and Iw1 are supplied from the first inverter 10 to the first stator 31 based on each of the instruction values.

The motor controller 5, specifically either the control section 5a realized as a microcomputer or the second drive controller 5a4, also generates the second driving signal for driving the second inverter 20 and outputs the second driving signal to the second inverter 20 at S190 based on the U2 phase current instruction value, the V2 phase current instruction value, and the W2 phase current instruction value computed at S180. In such manner, the second three-phase currents Iu2, Iv2, and Iw2 are supplied from the second inverter 20 to the second stator 32 based on each of the instruction values.

(1-7) Example Current Waveform

The waveforms of the electric currents to be supplied to each of the coils in the stators 31, 32 are shown respectively in FIGS. 8A-8F. That is, for each of the coils (i.e., for each of the phases U, V, and W), the base current waveforms before the superposition of the compensation current are shown respectively in FIGS. 8A-8F together with the compensation current and the supplied electric current waveforms, where the supplied electric current waveform is the base current waveform with the compensation current waveform subtracted therefrom (e.g., superposed thereon).

As shown in FIGS. 8A-8F, the second three-phase base currents Iu2o, Iv2o, and Iw2o have the same frequency as the first three-phase base currents Iu1o, Iv1o, and Iw1o, with the phase of each current shifted by 180 degrees from the phase of each of the first three-phase base currents. The phase shift of 180 degrees is caused by a shift of the arrangement position of the second stator 32 relative to the arrangement position of the first stator 31 by a certain mechanical angle that corresponds to a 180-degree electrical angle. In the present embodiment, the shift of the mechanical angle is 180 degrees.

The second compensation current −Io has the same phase as the first compensation current Io, but with a reversed polarity. That is, the waveform of the second compensation current −Io is a flipped waveform of the first compensation current Io. Each compensation current has a triangular waveform and is the third harmonic (i.e., third-order harmonic frequency) of the base frequency.

Figure 8A:
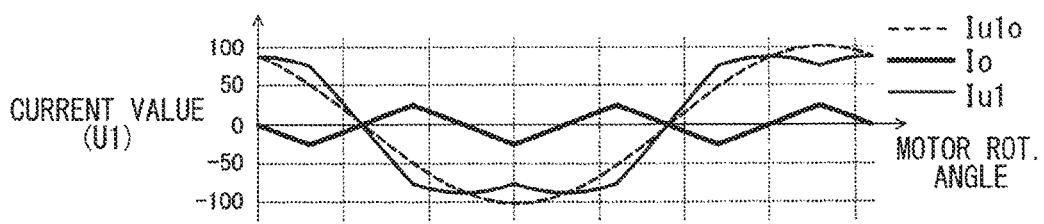
FIG. 8A illustrates a waveform of a current to be supplied to a U phase coil in a first stator of the motor device in the first embodiment of the present disclosure.
Figure 8B:
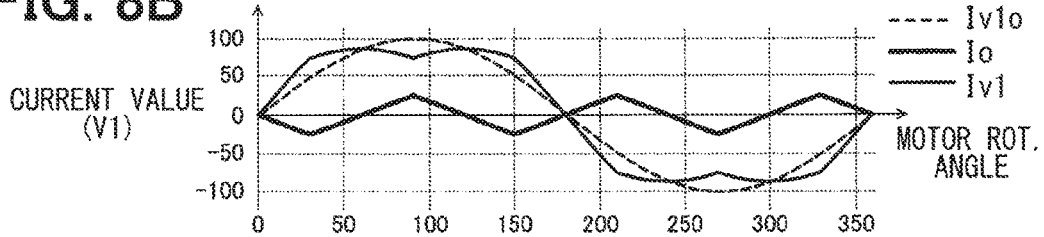
FIG. 8B illustrates a waveform of a current to be supplied to a V phase coil in the first stator of the motor device in the first embodiment of the present disclosure.
Figure 8C:
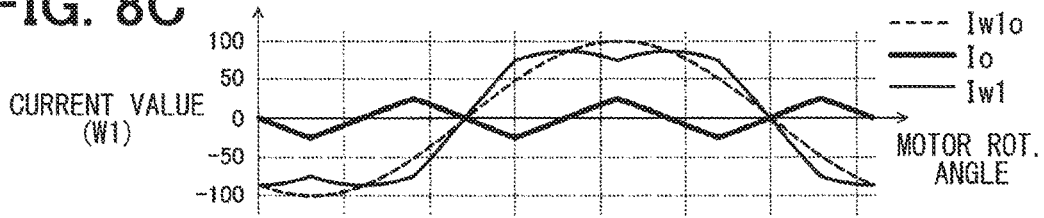
FIG. 8C illustrates a waveform of a current to be supplied to a W phase coil in the first stator of the motor device in the first embodiment of the present disclosure

As an illustrative example, with reference to FIG. 8A, when the rotation angle of the motor 3 is 150 degrees in the U1 phase, the U1 phase base current Iu1o takes a peak value. In this case, the peak value of the base current Iu1o when the motor 3 is at a rotation angle of 150 degrees is about −100 A. When the first compensation current is superposed on (e.g., subtracted from) the U1 phase base current Iu1o, such a peak value of the U1 phase base current Iu1o is lowered. That is, the peak value of the U1 phase current Iu1 is lowered to be less than the peak value of the U1 phase base current Iu1o. In this example, the value of the first compensation current is about −25 A when the rotation angle of the motor 3 is at 150 degrees. Thus, when the U1 phase current Iu1 is computed by subtracting the first compensation current Io from the U1 phase base current Iu1o, the peak value of the U1 phase current Iu1 is about −75 A when the rotation angle of the motor is at 150 degrees.

The polarity of the second compensation current (e.g., −Io) is reversed relative to the first compensation current (e.g., Io) in terms of the +/− sign. Thus, the arrangement position of the second stator 32 is shifted by 180 degrees relative to the arrangement position of the first stator 31, to have a phase shift of 180 degrees for the second three-phase base current relative to the phase of the first three-phase base current. Therefore, a peak value is lowered for both of the first three-phase base current and the second three-phase base current due to the superposition of the corresponding compensation current.

Figure 8D:
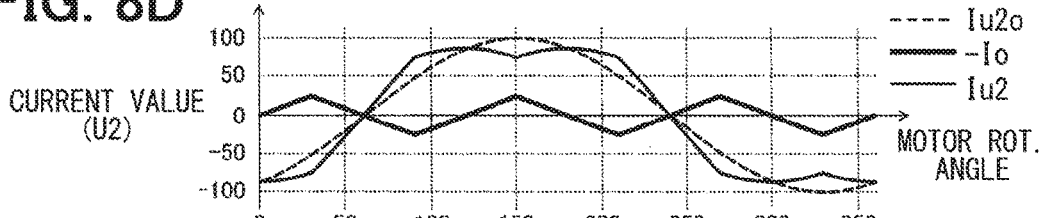
FIG. 8D illustrates a waveform of a current to be supplied to a U phase coil in a second stator of the motor device in the first embodiment of the present disclosure.
Figure 8E:
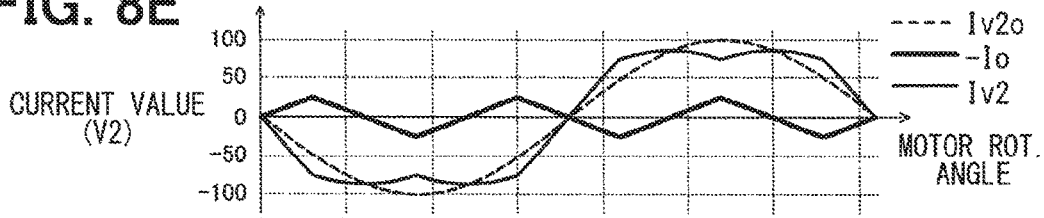
FIG. 8E illustrates a waveform of a current to be supplied to a V phase coil in the second stator of the motor device in the first embodiment of the present disclosure.
Figure 8F:
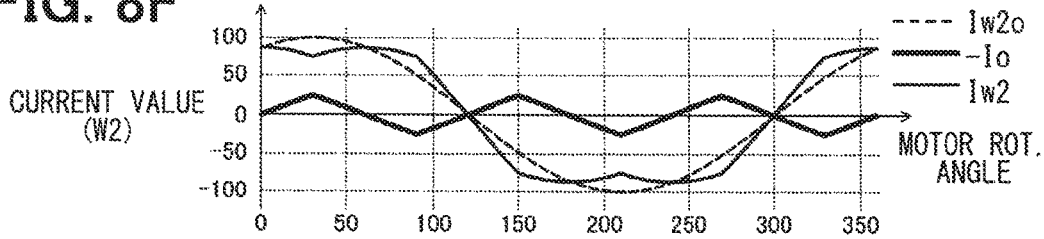
FIG. 8F illustrates a waveform of a current to be supplied to a W phase coil in the second stator of the motor device in the first embodiment of the present disclosure.

For example, as shown in FIG. 8D, the peak value of the U2 phase current Iu2 is about 75 A when the rotation angle of the motor is at 150 degrees, due to the shift of the arrangement position of the second stator 32, as described above.

Figure 9A:
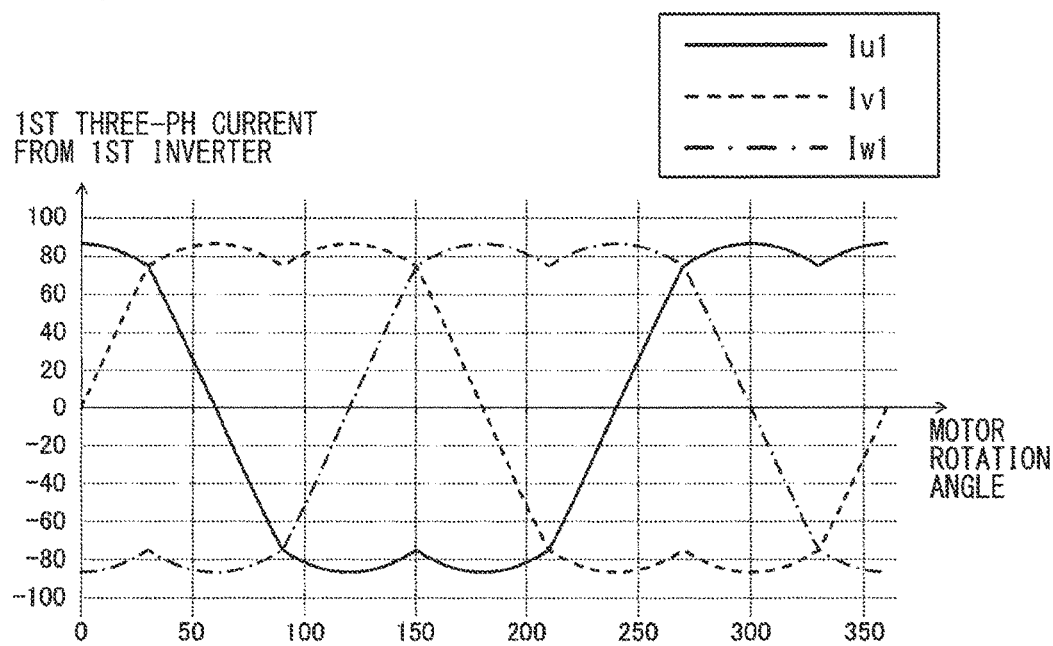
FIG. 9A illustrates waveforms of first three-phase currents supplied to the motor device on which a compensation current is superposed in the first embodiment of the present disclosure.
Figure 9B:
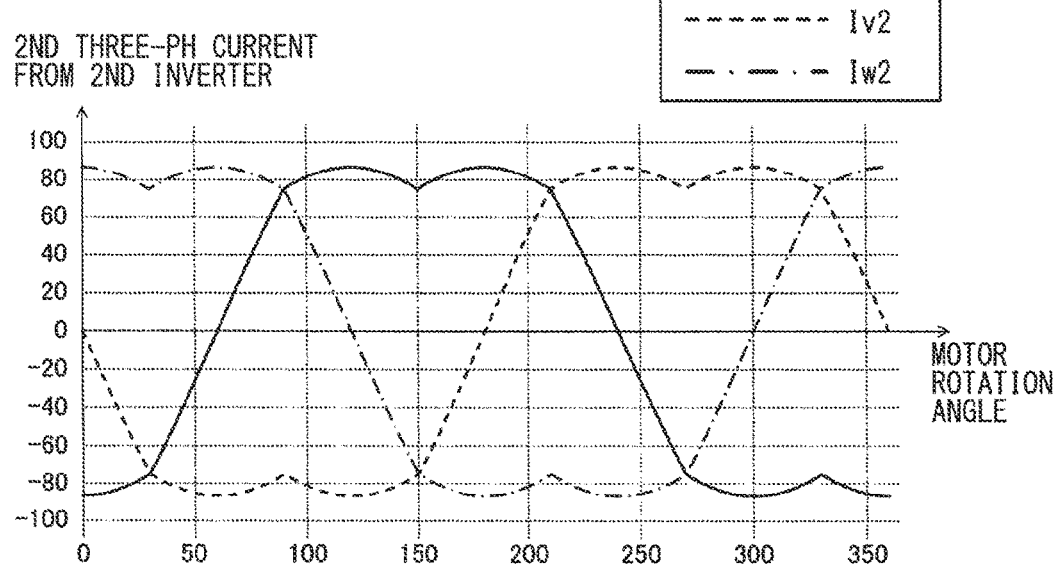
FIG. 9B illustrates waveforms of second three-phase currents supplied to the motor device on which the compensation current is superposed in the first embodiment of the present disclosure.

FIGS. 9A and 9B show an extraction of the compensated phase current waveforms shown in FIGS. 8A-8F for each of the two inverters 10 and 20. That is, when the superposition of the compensation current is performed, the three-phase current having a waveform shown in FIG. 9A is supplied from the inverter 10 to the stator 31, and the three-phase current having a waveform shown in FIG. 9B is supplied from the inverter 20 to the stator 32.

The torque generated by the rotor 33 based on the supply of the compensated first three-phase currents (i.e., from the compensated phase current waveform) to the first stator 31 is equal to the torque generated by the first three-phase base currents. In other words, the torque generated by the rotor 33 using the compensated currents is equal to the torque generated by the first three-phase base currents without the compensation. Since the first compensation current having the same phase is subtracted from (i.e., superposed on) each of the three-phase base currents, there is no torque change due to the superposition of the first compensation current. Similarly, there is no torque change between the second three-phase currents on which the second compensation current is superposed. That is, the torque generated by the rotor 33 by receiving a supply of the second three-phase current to the second stator 32 is the same regardless of the superposition of the second compensation current.

(1-8) Effects of the First Embodiment

The following effects may be achieved by the first embodiment described above.

In the motor drive system 1 in the present embodiment, when the current compensation conditions are satisfied, the first stator 31 receives a supply of the first three-phase currents Iu1, Iv1, Iw1 that are the first-three phase base currents Iu1o, Iv1o, and Iw1o, where the first compensation current Io having the same phase has been subtracted (i.e., superposed on). Further, when the current compensation conditions are satisfied, the second stator 32 receives a supply of the second three-phase currents 1u2, Iv2, 1w2 that are the second-three phase base current Iu2o, Iv2o, and Iw2o, where the second compensation current −Io having the same phase has been subtracted (i.e., superposed on).

The second compensation current −Io is an electric current having the same phase as the first compensation current Io, but with a reversed polarity.

In such manner, the motor drive system 1 of the present embodiment can lower the peak value of the first three-phase currents Iu1, Iv1, Iw1 to be lower than the peak value of the first three-phase base currents Iu1o, Iv1o, and Iw1o where no first compensation current Io is superposed. The motor drive system 1 can also control the peak value of the second three-phase currents Iu2, Iv2, Iw2 to be lower than the peak value of the second three-phase base current Iu2o. Iv2o, and Iw2o where no second compensation current −Io is superposed. Therefore, it is possible to control and restrict the current supplied to each of the phase coils of each of the stators 31 and 32 when the motor 3 locks, while continuing the supply of each of the three-phase currents, even when the motor 3 is in a lock state.

By lowering the peak value of each of the phase currents, the maximum loss of the semiconductor switching elements used in each of the inverters 10 and 20 may be reduced, thereby improving the fuel consumption rate of the vehicle. By lowering the peak value of each of the phase currents, the volume and weight of the wiring that is used for supplying each of the three-phase currents from the inverters 10 and 20 to the stators 31 and 32 may also be reduced.

In the present embodiment, the arrangement position of each of the stators 31 and 32 is shifted by 180 degrees from each other, and the motor controller 5 generates the instruction values of the three-phase base currents to a provide maximum torque from each of the stators 31 and 32 to the rotor 33 according to the rotation angle of the rotor 33. As such, the phase difference between the first and second three-phase base currents will also be 180 degrees.

Although the second compensation current −Io differs in the phase by 180 degrees relative to the first compensation current Io, since the second three-phase base current also differs in the phase by 180 degrees relative to the first three-phase base current, a peak value is lowered by the corresponding compensation current for each of all three-phase currents.

Each compensation current is generated based on the first three-phase base currents Iu1o, Iv1o, and Iw1o. Therefore, each compensation current is easily and appropriately computable.

In particular, in the present embodiment, as shown in S140-S160, the average of the maximum and the minimum of the first three-phase base currents Iu1o, Iv1o, and Iw1o is set and used as the first compensation current, and the same value as the first compensation current with a reversed polarity is set and used as the second compensation current. In such operation, each of the compensation currents is computed as a triangular waveform current as a third harmonic frequency of the three-phase base current, where the frequency of the compensation current is three times the frequency of the three-phase base currents. By adopting such a computation method, each of the compensation currents easily enables an appropriate lowering of the peak value for each of the three-phase currents.

In the present embodiment, based on the determination of whether the current compensation conditions are satisfied, the compensation current is superposed. By predefining the current compensation conditions and configuring the motor drive system 1 to detect such current compensation conditions, the compensation current may be superposed when conditions for lowering the peak value, such as a motor lock state, are satisfied. On the other hand, when there is no need to superpose the compensation current, superposition of the compensation current will not be performed, thereby reducing the processing load for the superposition of the compensation current.

In the present embodiment, the current compensation conditions include a condition that the motor 3 is locked. Thereby, when the motor 3 locks, a large current close to the peak value of the three-phase base current is prevented from continuously flowing in any of the coils.

Second Embodiment

Since the configuration of the second embodiment is basically the same as that of the first embodiment, the following description focuses on the differences between the first embodiment and the second embodiment. Like elements and features between the first embodiment and the second embodiment are represented in the drawings by the same reference characters and repeat descriptions of the like features and elements in the second and subsequent embodiments are omitted for brevity.

Figure 10A:
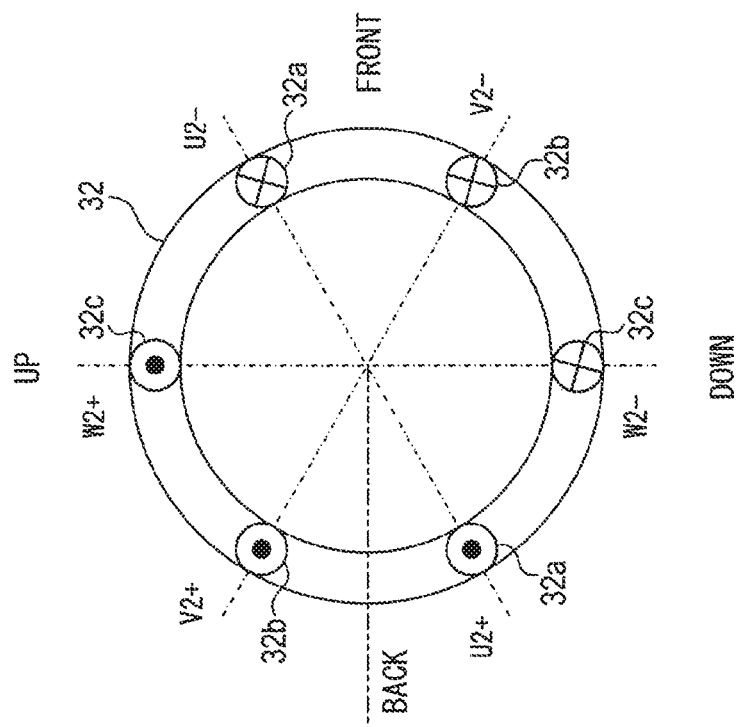
FIG. 10A illustrates a coil position arrangement in one of the two stators of the motor device as viewed from the direction of arrow A shown in FIG. 3 in a second embodiment of the present disclosure.
Figure 10B:
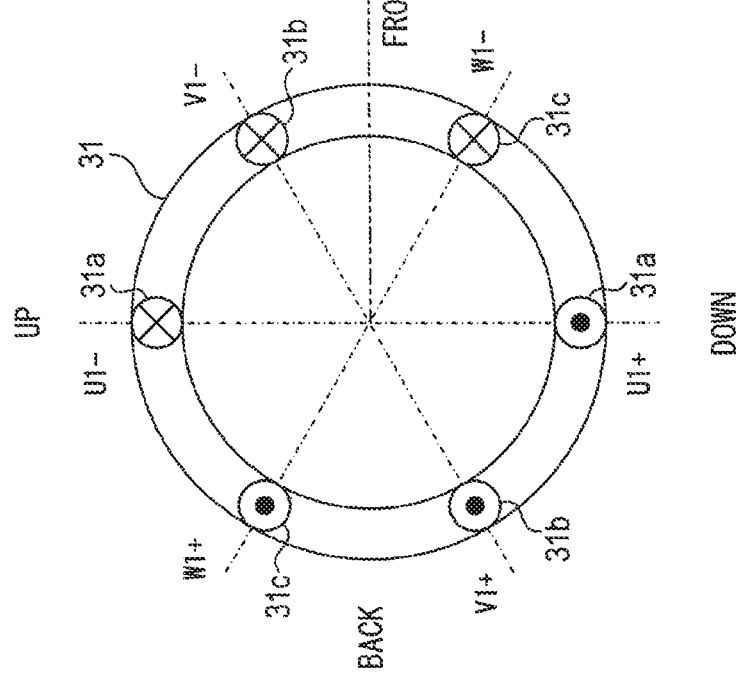
FIG. 10B illustrates a coil position arrangement in another of the two stators of the motor device as viewed from the direction of arrow A shown in FIG. 3 in the second embodiment of the present disclosure.

In the motor 3 described in the first embodiment above, the arrangement position of the second stator 32 is shifted by 180 degrees relative to the first stator 31. However, as shown in FIGS. 10A and 10B, the arrangement positions of the first stator 31 and the second stator 32 of the motor 3 in the second embodiment may be different. As shown in FIGS. 10A and 10B, the arrangement position of the second stator 32 is shifted by 60 degrees relative to the first stator 31.

The motor controller 5 supplies each of the three-phase currents to the motor 3 in such configuration, by performing the motor control process shown in FIG. 7.

Example waveforms of the electric currents in respective phases supplied to each of the coils in the stators 31 and 32 in the second embodiment are shown in FIGS. 11A-11F.

Figure 11A:
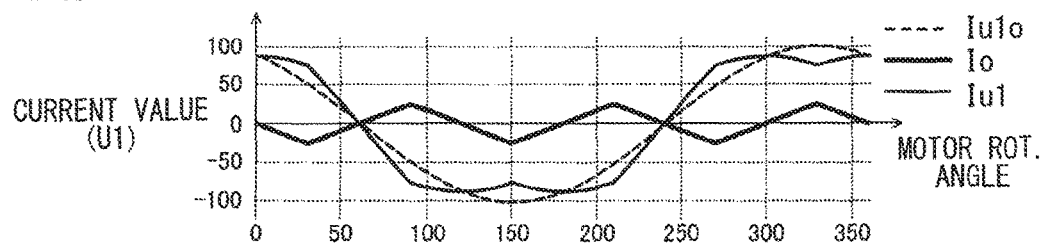
FIG. 11A illustrates a waveform of a current to be supplied to a U phase coil in a first stator of the motor device in the second embodiment of the present disclosure.
Figure 11B:
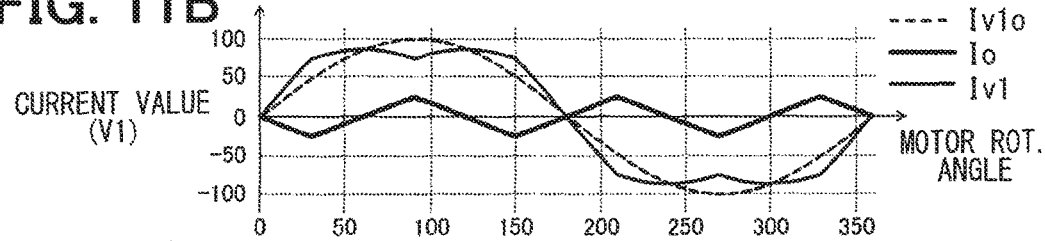
FIG. 11B illustrates a waveform of a current to be supplied to a V phase coil in the first stator of the motor device in the second embodiment of the present disclosure.
Figure 11C:
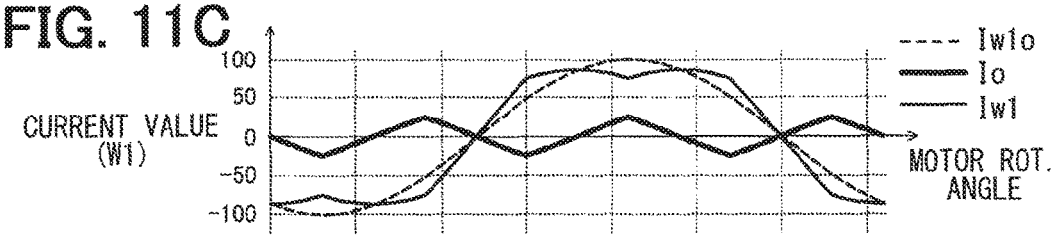
FIG. 11C illustrates a waveform of a current to be supplied to a W phase coil in the first stator of the motor device in the second embodiment of the present disclosure
Figure 11D:
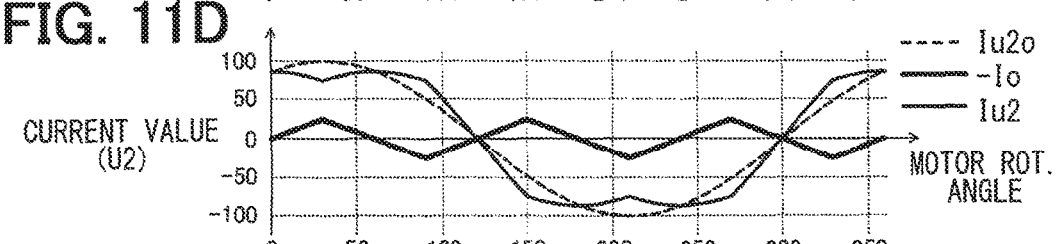
FIG. 11D illustrates a waveform of a current to be supplied to a U phase coil in a second stator of the motor device in the second embodiment of the present disclosure.
Figure 11E:
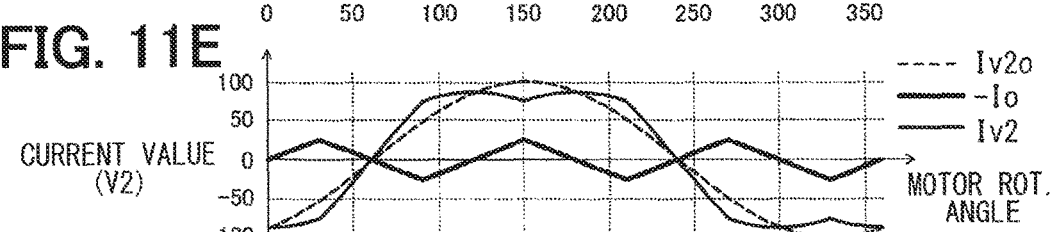
FIG. 11E illustrates a waveform of a current to be supplied to a V phase coil in the second stator of the motor device in the second embodiment of the present disclosure.
Figure 11F:
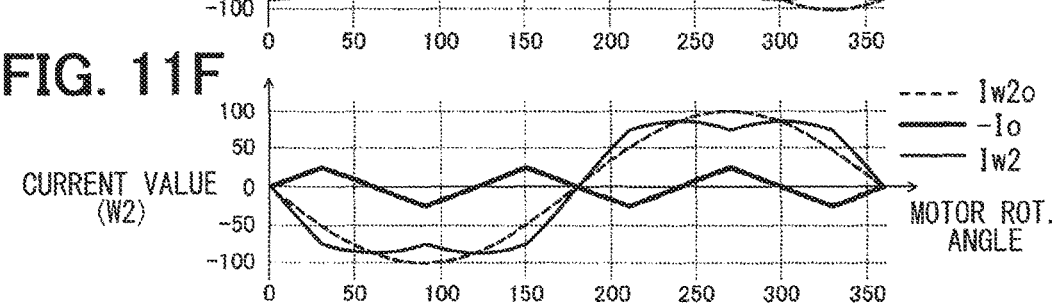
FIG. 11F illustrates a waveform of a current to be supplied to a W phase coil in the second stator of the motor device in the second embodiment of the present disclosure.

As shown in FIGS. 11A-11F, as the second three-phase base currents Iu2o, Iv2o, and Iw2o, the phase is shifted 60 degrees relative to the first three-phase base currents Iu1o, Iv1o, and Iw1o. In other words, the second three-phase base currents Iu2o, Iv2o, and Iw2o, as shown respectively in FIGS. 11D-11F are out of phase by 60 degrees relative to the corresponding first three-phase base currents Iu1o, Iv1o, and Iw1o, shown respectively in FIGS. 11A-11C.

The phase shift of 60 degrees originates in (i.e., is caused by) a shift of the 60-degree mechanical angle of the arrangement position of the second stator 32 relative to the arrangement position of the first stator 31, corresponding to a shift of the 60-degree electrical angle.

In the second embodiment, a peak value is reduced in both of the first three-phase base currents and the second three-phase base currents by the superposition of the corresponding compensation currents.

Figure 12A:
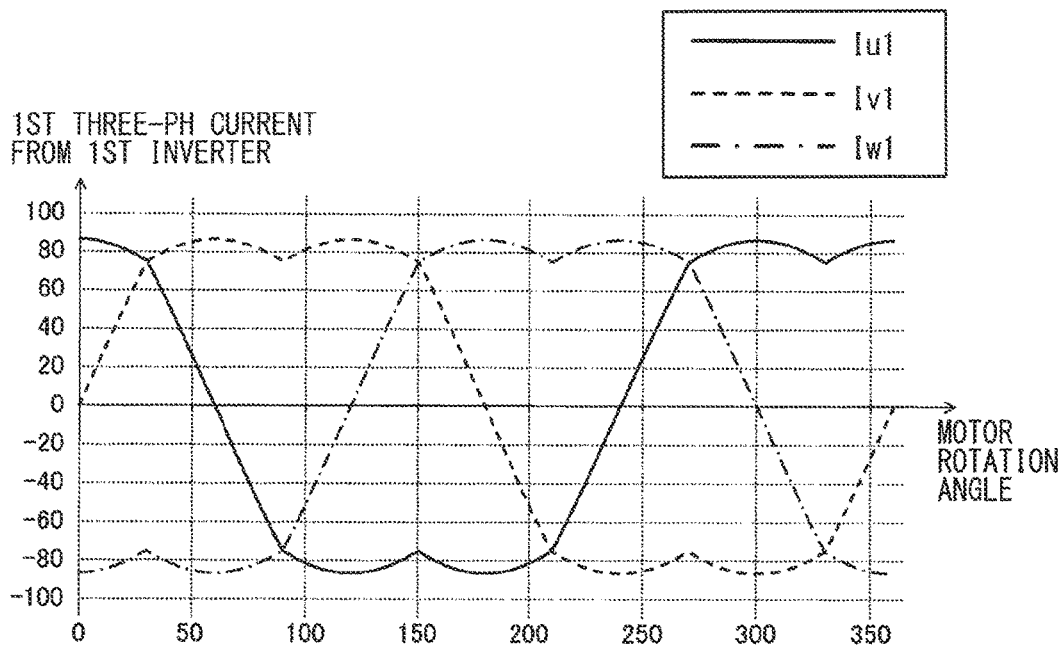
FIG. 12A illustrate waveforms of the first three-phase currents supplied to the motor device on which the compensation current is superposed in the second embodiment of the present disclosure.
Figure 12B:
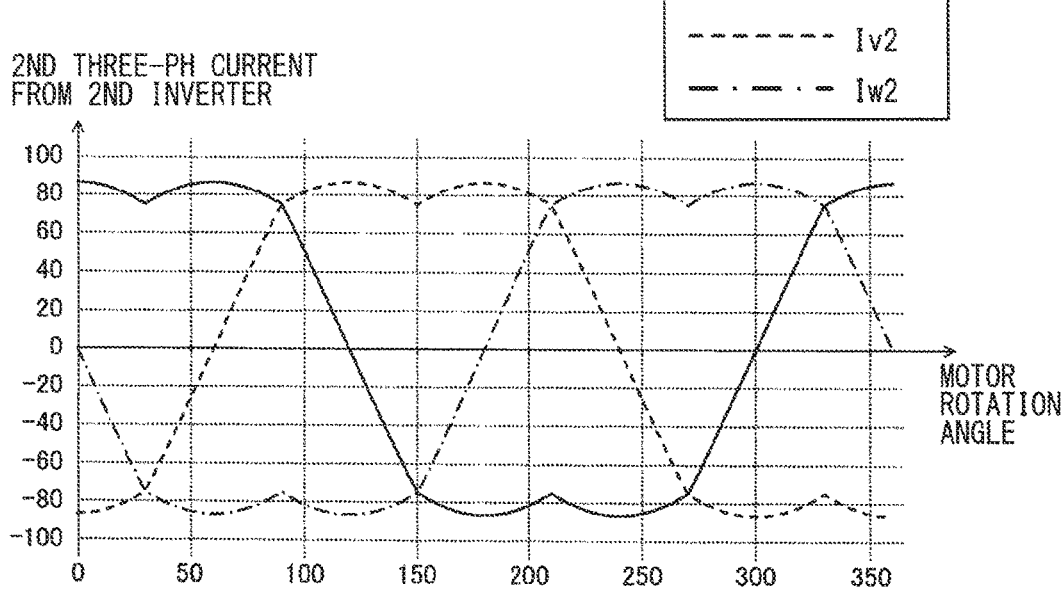
FIG. 12B illustrate waveforms of the second three-phase currents supplied to the motor device on which the compensation current is superposed in the second embodiment of the present disclosure.

FIGS. 12A and 12B are respectively an extraction of the waveform when the compensation current is superposed for the respective inverters, based on the waveform of each of the phases in FIGS. 11A-11F. That is, in the second embodiment, when superposition of the compensation current is performed, the three-phase currents having a waveform shown in FIGS. 12A and 12B are supplied from the inverters 10 and 20 to the stators 31 and 32.

In the second embodiment, the torque generated by the rotor 33 according to the first three-phase currents on which the first compensation current is superposed is the same as the torque generated by the rotor 33 based on the first three-phase currents on which no first compensation current is superposed. The same applies to the torque generated by the rotor 33 based on the second three-phase currents on which the second compensation current is superposed.

Therefore, the motor controller in such configuration in the second embodiment achieves the same effects as the first embodiment.

Other Embodiments

Although various embodiments of the present disclosure are described above, further modifications of such embodiments may still be possible without limitation.

The compensation current may be computed by other methods. That is, the computation of the compensation current based on the maximum and the minimum of the first three-phase base currents $Iu1o$, $Iv1o$, and $Iw1o$ in the first embodiment, for example, as described at S140-S160 in FIG. 7, and generation of the triangular waveform compensation current having a third-order harmonic frequency of the base current frequency, is a non-limiting example of such a computation method.

The waveform, the amplitude and, the frequency of the compensation current, as well as a relationship between the frequency of the compensation current and the phases of the three-phase base currents, may be changed and/or determined in different ways. For example, the frequency of the compensation current is not limited to the third-order harmonic frequency of the three-phase base currents, but may also be an n-th order harmonic where "n" is a natural number of 2 or more. That is, the compensation current may be a second harmonic or more of the three-phase base currents. Further, the compensation current may not necessarily be an electric current with a periodically-changing waveform. For example, the compensation current may be a DC current.

The compensation current may be an electric current which enables a reduction of the peak value of each of the three-phase currents to at least one of two inverters 31 and 32, which is computable by various computation methods appropriate for such purposes.

The phase difference, or rather a "base current phase difference," among the three-phase base currents and/or the amount of shift angle between the arrangement positions of the stators 31 and 32, or rather a "stator angle shift amount," is not necessarily limited to the amounts in the above-described embodiments.

That is, the base current phase difference of 180 degrees and the stator angle shift amount of 180 degrees in the first embodiment, as well as the base current phase difference of 60 degrees and the stator angle shift amount of 60 degrees in the second embodiment are respectively non-limiting examples.

At least one of the base current phase difference and the stator angle shift amount may be determined arbitrarily as long as at least one of them is capable of reducing the peak value of at least one of the three-phase currents supplied to the stators 31 and 32 when the superposition of the compensation current is performed.

For example, the configuration of each of the stators 31 and 32 and the stator angle shift amount, together with other factors, may be arbitrarily determined as shown by the above example, i.e., the three-phase currents that are supplied from the stators 31 and 32 with the 180-degree base current phase difference are computable to enable a generation of the maximum torque by the rotor.

The arrangement of the coils in the stators 31 and 32 may be different from the arrangements shown in FIGS. 4A and 4B. That is, the coil arrangement configurations and the coil winding methods may generally vary in the stators of the synchronous motors, and the motor controller of the present disclosure is applicable to any of those variations of the stator configuration and to the configuration of the motor device.

The motor 3, which is described as a "two stators and one rotor" type motor, as an example of the motor device in the above-mentioned embodiments, may have a different configuration. That is, the motor device may have a configuration of at least two stators and with three coils in a wye configuration in each of the stators together with a neutral point connection between the two stators. The rotor of the motor device may not be limited to a permanent-magnet type, but may also be other types.

Figure 13:
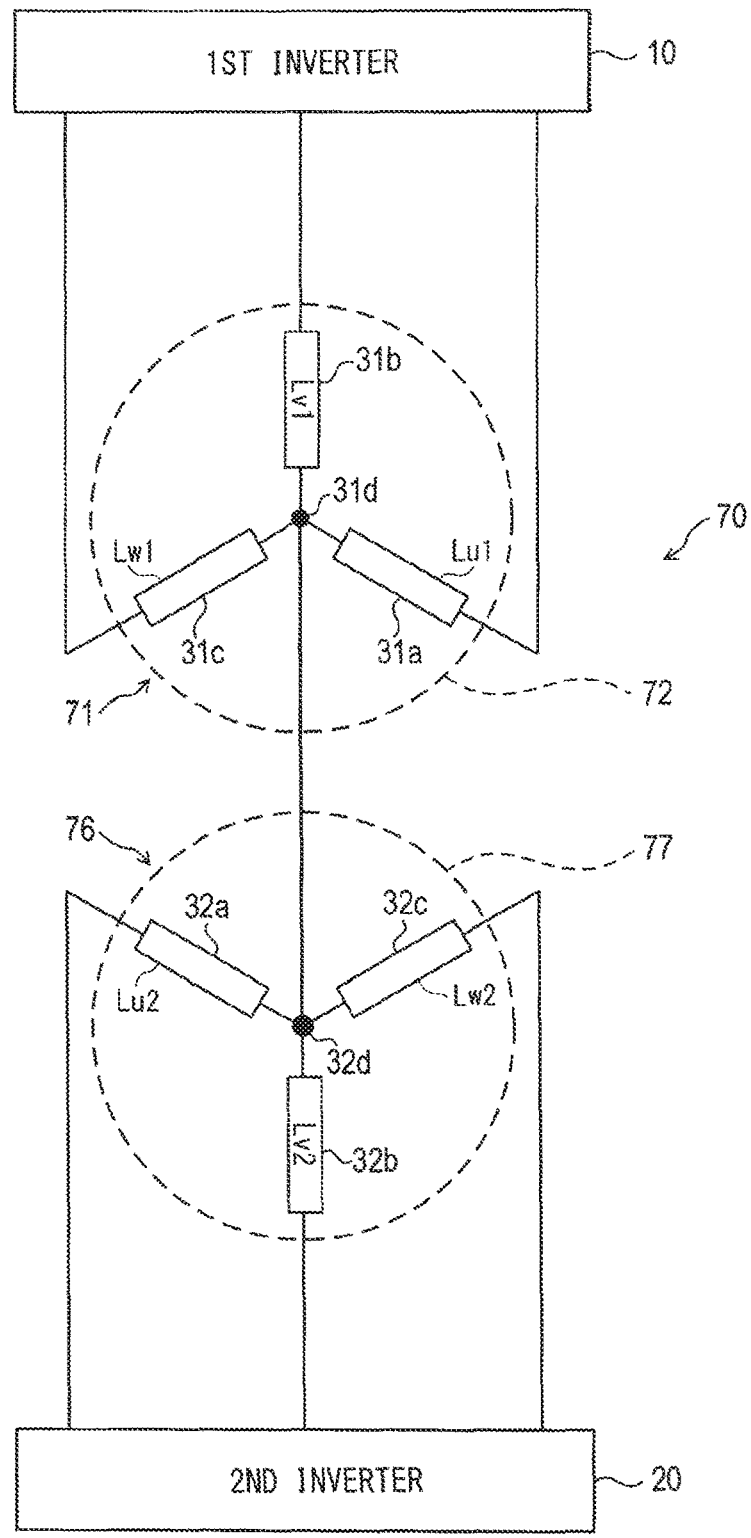
FIG. 13 illustrates a schematic diagram of the motor device in other embodiments of the present disclosure.

For example, the configuration shown in FIG. 13 may suffice. FIG. 13 illustrates a motor device 70 configured as a combination of two motors 71 and 76 respectively having one stator and one rotor. In the motor device 70 in FIG. 13, the motor 71 has one stator and one rotor (not illustrated), and the motor 76 also has one stator and one rotor (not illustrated), where the neutral points $31d$ and $32d$ of two stators 72 and 77 are electrically connected to each other.

Current compensation conditions may include other kinds of conditions. For example, the current compensation conditions may include at least one condition that does not involve a lock of the motor 3. Alternatively, the current compensation conditions may include at least one condition, in addition to a "motor 3 locked" condition. When two or more conditions are included as current compensation conditions, satisfaction of the current compensation conditions may be determined as (i) a satisfaction of at least one of those conditions (e.g., the occurrence or fulfillment of at least one of the conditions), as (ii) a satisfaction of at least two conditions, or as (iii) a satisfaction of all conditions.

Alternatively, when the three-phase base currents are supplied from the inverters 10 and 20 to the motor 3, it may be determined as a satisfaction of the current compensation conditions. That is, in other words, when the motor 3 is driven, the compensation current may always be superposed on each of the three-phase base currents.

In the control operation of both of the inverters 10 and 20 performed by the motor controller, it is not necessary to compute a three-phase current instruction value for both of the inverters 10 and 20. For example, in the control operation of the second inverter 20, a so-called vector control operation method may be adopted as a control operation without computing the three-phase current instruction values, for generating the drive signal to the second inverter 20. In such case, without taking the compensation current into consideration in the control operation of the second inverter 20, it is only necessary to compute, for example, a d-axis current instruction value and a q-axis current instruction value at S180 in the motor control process of FIG. 7. Even when the vector control operation method is adopted for generating the second three-phase currents to the second inverter 20, each of the second three-phase currents includes the second compensation current as a result.

In the above-described embodiments, a part of the configuration described above may be dispensable. That is, elements and features of one embodiment may be removed. Likewise, portions, features, and elements from one embodiment may be combined with those described in other embodiments.

Besides the motor controller described above, the present disclosure may also be realized as a motor drive system using the motor controller described above as one of its components. The present disclosure also contemplates the methods performed by the motor controller described above, as well as a non-transitive, substantive storage medium, such as a semiconductor memory, that stores a program or instruction set, that, when executed by a processor, causes the methods described above to be performed by the motor controller or other components, as well as other various modifications.

Although the present disclosure has been fully described in connection with embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A motor controller configured to control a motor drive system having a motor device that includes a first stator having three coils and a second stator having three coils, a rotor configured to be rotated by magnetic fields produced by the first stator and the second stator, a first inverter configured to supply three-phase electric current to the first stator, and a second inverter configured to supply three-phase electric current to the second stator, the motor controller comprising:
a first calculator configured to calculate first three-phase base currents for rotating the rotor, each of the first three-phase base currents calculated according to a rotation position of the rotor;
a first drive controller configured to control the first inverter to supply first three-phase currents to the three coils of the first stator, by superposing a first compensation current on each of the first three-phase base currents calculated by the calculator; and
a second drive controller configured to control the second inverter to supply second three-phase currents to the three coils of the second stator for rotating the rotor, each of the second three-phase currents generated by including a second compensation current, wherein
the second compensation current is reversely polarized relative to the first compensation current.

2. The motor controller of claim 1 further comprising:
a second calculator configured to calculate second three-phase base currents for rotating the rotor, the second three-phase base currents having a same frequency as the first three-phase base currents and phased relative to the rotation position of the rotor, wherein
the second drive controller is further configured to control the second inverter to supply the second three-phase currents calculated by the second calculator to the three coils of the second stator, the second three-phase currents respectively generated by superposing the second compensation current on the second three-phase base currents.

3. The motor controller of claim 2, wherein
the first calculator is further configured to calculate a phase of the first three-phase base current, and wherein
the second calculator is further configured to calculate a phase of the second three-phase base current, and wherein
the phase of the second three-phase base current is different than the phase of the first three-phase base current.

4. The motor controller of claim 3, wherein
an arrangement position of the three coils of the second stator is rotationally offset from an arrangement position of the three coils of the first stator by a preset angle in a rotation direction of the rotor, and wherein the second calculator is further configured to calculate the phase of the second three-phase base current by an electric angle that corresponds to the preset angle of rotational offset between the arrangement position of the coils of the second stator and the arrangement position of the three coils of the first stator.

5. The motor controller of claim 4, wherein
the preset angle is an angle corresponding to the electric angle of 180 degrees.

6. The motor controller of claim 1, wherein
a frequency of the first compensation current and a frequency of the second compensation current are a harmonic frequency of a frequency of the first three-phase base current, and wherein
the harmonic frequency is at least a second harmonic frequency.

7. The motor controller of claim 6, wherein
the harmonic frequency is a third harmonic frequency.

8. The motor controller of claim 1 further comprising:
a compensation current calculator configured to calculate the first compensation current based on the first three-phase base current, wherein
the first drive controller superposes the first compensation current calculated by the compensation current calculator on the first three-phase base currents.

9. The motor controller of claim 7 further comprising:
a compensation current calculator configured to calculate, the first compensation current as an average of a maximum value and a minimum value of the first three-phase base current, wherein
the first drive controller superposes, the first compensation current calculated by the compensation current calculator on the first three-phase currents.

10. The motor controller of claim 1 further comprising:
a compensation condition determiner configured to determine whether a current compensation condition is satisfied, wherein
the first drive controller is further configured (i) to supply the first three-phase currents without including the first compensation current when the compensation condition determiner determines that the current compensation condition is not satisfied, and (ii) to supply the first three-phase currents including the first compensation current when the compensation condition determiner determines that the current compensation condition is satisfied, and
the second drive controller is further configured (i) to supply the second three-phase currents without including the second compensation current when the compensation condition determiner determines that the current compensation condition is not satisfied, and (ii) to supply the second three-phase current including the second compensation current when the compensation condition determiner determines that the current compensation condition is satisfied.

11. The motor controller of claim 10, wherein
the current compensation condition is that the motor device is locked.

12. A motor drive system comprising:
a motor device that includes a first stator having three coils connected in a wye configuration and a neutral point, a second stator having three coils connected in a wye configuration and a neutral point, and a rotor;
a first inverter configured to supply three-phase electric current to the first stator;
a second inverter configured to supply three-phase electric current to the second stator;

a calculator configured to calculate first three-phase base currents for rotating the rotor, the first three-phase base currents calculated based on a rotation position of the rotor:

a first drive controller configured to control the first inverter to supply first three-phase currents to the three coils of the first stator by superposing a first compensation current on each of the first three-phase base currents calculated by the calculator; and a second drive controller configured to control the second inverter to supply second three-phase currents to the three coils of the second stator, the second three-phase currents for rotating the rotor, wherein each of the second three-phase currents are generated by including a second compensation current, wherein the neutral point of the first stator is connected to the neutral point of the second stator, and wherein the second compensation current is reversely polarized relative to the first compensation current.

* * * * *